United States Patent
Max et al.

(10) Patent No.: US 12,137,484 B2
(45) Date of Patent: Nov. 5, 2024

(54) METHODS, APPARATUS AND MACHINE-READABLE MEDIA RELATING TO WIRELESS TRANSMISSION IN A COMMUNICATION NETWORK

(71) Applicant: Telefonaktiebolaget LM Ericsson (publ), Stockholm (SE)

(72) Inventors: Sebastian Max, Cologne (DE); Miguel Lopez, Solna (SE); Dennis Sundman, Sollentuna (SE); Leif Wilhelmsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 303 days.

(21) Appl. No.: 17/626,022

(22) PCT Filed: Apr. 24, 2020

(86) PCT No.: PCT/EP2020/061551
§ 371 (c)(1),
(2) Date: Jan. 10, 2022

(87) PCT Pub. No.: WO2021/008746
PCT Pub. Date: Jan. 21, 2021

(65) Prior Publication Data
US 2022/0256596 A1    Aug. 11, 2022

Related U.S. Application Data

(60) Provisional application No. 62/873,344, filed on Jul. 12, 2019.

(51) Int. Cl.
H04W 74/08    (2024.01)
H04L 1/00    (2006.01)
(Continued)

(52) U.S. Cl.
CPC ......... H04W 74/085 (2013.01); H04L 1/0003 (2013.01); H04L 5/0053 (2013.01);
(Continued)

(58) Field of Classification Search
CPC ........... H04W 74/085; H04W 74/0866; H04W 74/0808; H04W 72/0446; H04L 1/0003; H04L 5/0053
See application file for complete search history.

(56) References Cited

U.S. PATENT DOCUMENTS 9,510,346 B2 * 11/2016 Azizi ................ H04J 11/00
2008/0219226 A1 * 9/2008 Oishi ................ H04L 1/1825
370/338
2017/0079010 A1    3/2017 Zhang et al.

FOREIGN PATENT DOCUMENTS

JP    2007-509532 A    4/2007
JP    2018-512765 A    5/2018
WO   WO-2005039105 A1 *  4/2005  ............. H04L 12/28

OTHER PUBLICATIONS

International Search Report and Written Opinion of the International Searching Authority, PCT/EP2020/061551, mailed Sep. 23, 2020, 13 pages.
(Continued)

Primary Examiner — Brenda H Pham
(74) Attorney, Agent, or Firm — Sage Patent Group

(57) ABSTRACT

A method is performed by a wireless transmitting device for a communication network. The communication network implements a standard in which transmitting devices contend for access to a wireless transmission medium, a transmitting device being permitted to transmit using the wireless transmission medium for a window of time upon winning contention. The method includes: initiating a first, initial transmission to one or more wireless receiving devices in the window of time, the first transmission including a first
(Continued)

preamble; and, subsequent to the first transmission, initiating a second transmission to one or more wireless receiving devices in the window of time, the second transmission including a second preamble which is shorter than the first preamble, or including no preamble.

24 Claims, 15 Drawing Sheets

(51) Int. Cl.
  *H04L 5/00*    (2006.01)
  *H04W 72/0446* (2023.01)
  *H04W 74/0808* (2024.01)
  *H04W 74/0833* (2024.01)
(52) U.S. Cl.
  CPC ... *H04W 72/0446* (2013.01); *H04W 74/0808* (2013.01); *H04W 74/0866* (2013.01)

(56) References Cited

OTHER PUBLICATIONS

International Preliminary Report on Patentability of the International Preliminary Examining Authority, PCT/EP2020/061551, mailed Sep. 30, 2021, 19 pages.
Intel, Laurent Cariou, IEEE 802.11-18/0xxxr04, IEEE P802.11 Wireless LANs, 802.11 EHT Proposed PAR, Jan. 2019, 4 pages.
Marvell, Yan Zhang et al., IEEE 802.11-9/xxxxr0, Comparisons of HARQ transmission schemes for 11be, May 8, 2019, 22 pages.
LG Electronics, Jinmin Kim et al., IEEE 802.11-19/0780r0, Consideration of HARQ, May 13, 2019, 16 pages.
Quantenna, Imran Latif et al., IEEE 802.11-19/0873r0, HARQ Framing, May 13, 2019, 7 pages.
Broadcom, Ron Porat et al., IEEE 802.11-19/0798r0, HARQ Simulation Results, May 9, 2019, 8 pages.
Indian Examination Report dated Jul. 5, 2022 for Indian Patent Application No. 202117061888, 5 pages.
Japanese Office Action, Japanese application No. 2022-500821, mailed Apr. 4, 2023, 4 pages.

* cited by examiner

METHODS, APPARATUS AND MACHINE-READABLE MEDIA RELATING TO WIRELESS TRANSMISSION IN A COMMUNICATION NETWORK

CROSS REFERENCE TO RELATED APPLICATIONS

This application is a 35 U.S.C. § 371 national stage application of PCT International Application No. PCT/EP2020/061551 filed on Apr. 24, 2020, which in turns claims domestic priority to U.S. Provisional Patent Application No. 62/873,344, filed on Jul. 12, 2019, the disclosures and content of which are incorporated by reference herein in their entirety.

TECHNICAL FIELD

Embodiments of the present disclosure relate to communication networks, and particularly to methods, apparatus and machine-readable media for wireless transmission and reception in communication networks.

BACKGROUND

IEEE 802.11-2016 defines "Transmission Opportunities" (TXOPs) as an interval of time during which a particular station (STA) has the right to initiate frame exchange sequences. Here it will be noted that the abbreviation is used for both mobile stations (e.g., wireless user devices) and access points (APs). Thus the present disclosure is relevant to both downlink and uplink transmissions.

After performing a backoff procedure and winning contention for the channel, the TXOP starts. During the TXOP (the duration of which is limited by the access category of the data to be transmitted), the STA may initiate multiple frame exchange sequences without another backoff.

These frame exchange sequences can be data transmissions to a single receiving device or multiple receiving devices in the case of multiuser multiple-input multiple-output (MIMO) or multiuser orthogonal frequency-division multiple access (OFDMA). With the exception of the initial transmission in the TXOP, if a transmission during the TXOP fails and the remaining TXOP duration is sufficient long, the transmitting device is allowed to retransmit immediately without an additional backoff. This "fast retransmission" is especially advantageous in the case of frame aggregation with block acknowledgement, where only some frames require retransmission.

A typical frame exchange sequence within a TXOP is shown in FIG. 1. A transmitting STA, after performing a backoff procedure, starts the TXOP with an initial transmission to the receiving STA comprising data. The receiving STA acknowledges the transmission by transmitting an acknowledgement message to the transmitting STA; this can be a regular ACK frame or a Block-ACK for example. After this initial frame exchange, the transmitting STA may continue the TXOP after only a Short Interframe Space (SIFS) duration and without a new backoff procedure. In the example of FIG. 1, it sends a second transmission (Data') to the receiving STA, which is again acknowledged (ACK'). This concludes the TXOP.

IEEE 802.11 standards operate on the principle that each transmission is self-contained, in that it contains data or some other payload as well as the necessary control information and encoding parameters for the receiving device to decode the transmission. For this reason, each of the transmissions in the signaling shown in FIG. 1 comprises a preamble as well as data or an acknowledgement. The preamble contains the encoding parameters as well as other information which may be required, for example, to estimate the channel over which the transmission took place.

Work is currently ongoing to adapt and improve the IEEE 802.11 standards. The title of the 802.11be amendment is Extremely High Throughput and aims to support large bandwidths (up to 320 MHz), many spatial layers (up to 16) and high-order modulations. Hence, a large payload can be transported in one single OFDM symbol. The TXOP is a limited amount of time in which the transmitting device has permission to transmit using the wireless transmission medium. To increase the efficiency of the wireless network, it is desirable to make best use of this resource, i.e., to transmit as much data as possible within a given TXOP.

Hence, methods are desired which more efficiently utilize the available resources during a TXOP.

SUMMARY

Particularly for small payloads, the overhead due to the preamble is significant. One example of a transmission with a potentially small payload is a retransmission in a Hybrid Automatic Repeat Request (HARQ) scheme. Since only the erroneously decoded codewords need to be retransmitted, the size of the retransmission will often be significantly smaller than the size of the initial transmission. Therefore, it is expected that often retransmissions will have a relatively short time duration in the sense that the overhead due to the preamble is non-negligible.

Embodiments of the present disclosure seek to address these issues. In one aspect, there is provided a method performed by a wireless transmitting device for a communication network. The communication network implements a standard in which transmitting devices contend for access to a wireless transmission medium. A transmitting device is permitted to transmit using the wireless transmission medium for a window of time upon winning contention. The method comprises initiating a first, initial transmission to one or more wireless receiving devices in the window of time. The first transmission comprises a first preamble. The method further comprises, subsequent to the first transmission, initiating a second transmission to one or more wireless receiving devices in the window of time. The second transmission comprises a second preamble which is shorter than the first preamble, or comprises no preamble.

Apparatus and non-transitory machine-readable media are provided for performing the method set out above. For example, in one embodiment, a wireless transmitting device is provided, configured to perform the method set out above. In another embodiment, a wireless transmitting device comprises processing circuitry configured to perform the method set out above, and power supply circuitry configured to supply power to the wireless transmitting device. For example, the wireless transmitting device may comprise a non-transitory machine-readable medium storing instructions which, when executed by the processing circuitry, cause the wireless transmitting device to perform the method.

Another aspect provides a method performed by a wireless receiving device for a communication network. The communication network implements a standard in which transmitting devices contend for access to a wireless transmission medium. A transmitting device is permitted to transmit using the wireless transmission medium for a window of time upon winning contention. The method comprises: receiving a first, initial transmission from a wireless transmitting device in the window of time. The first transmission comprises a first preamble. The method further comprises, subsequent to the first transmission, receiving a second transmission from the wireless transmitting device in the window of time. The second transmission comprises a second preamble which is shorter than the first preamble, or comprises no preamble.

Apparatus and non-transitory machine-readable media are provided for performing the method set out above. For example, in one embodiment, a wireless receiving device is provided, configured to perform the method set out above. In another embodiment, a wireless receiving device comprises processing circuitry configured to perform the method set out above, and power supply circuitry configured to supply power to the wireless receiving device. For example, the wireless receiving device may comprise a non-transitory machine-readable medium storing instructions which, when executed by the processing circuitry, cause the wireless receiving device to perform the method.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
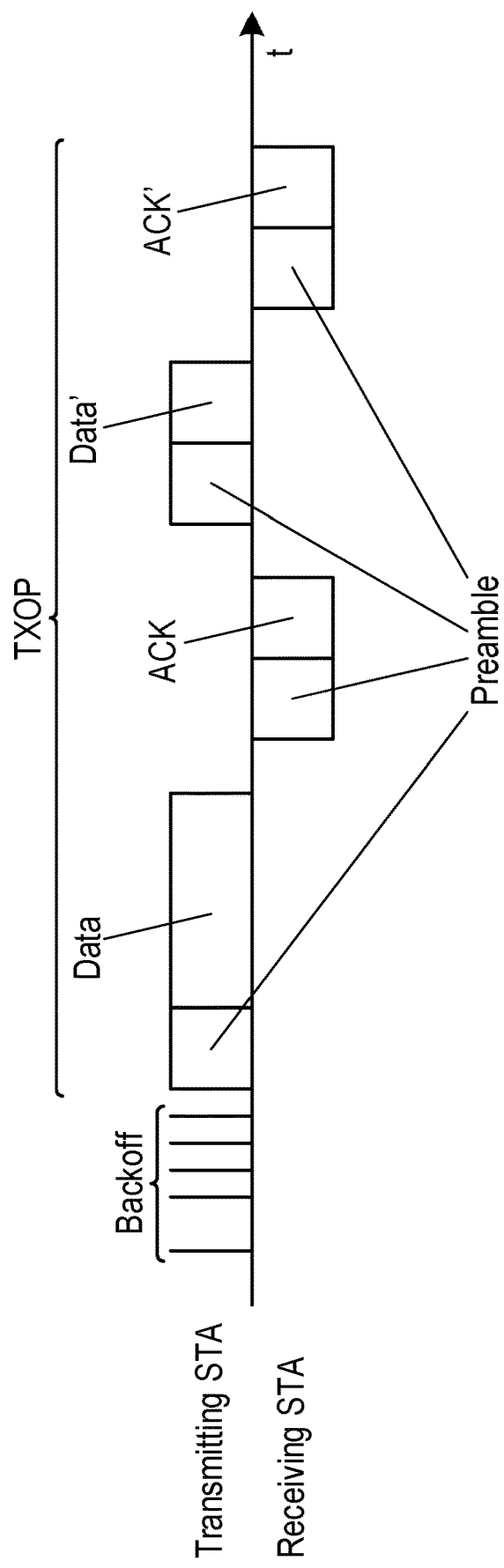
FIG. 1 is a schematic diagram showing conventional signalling during a transmission opportunity.
Figure 2:
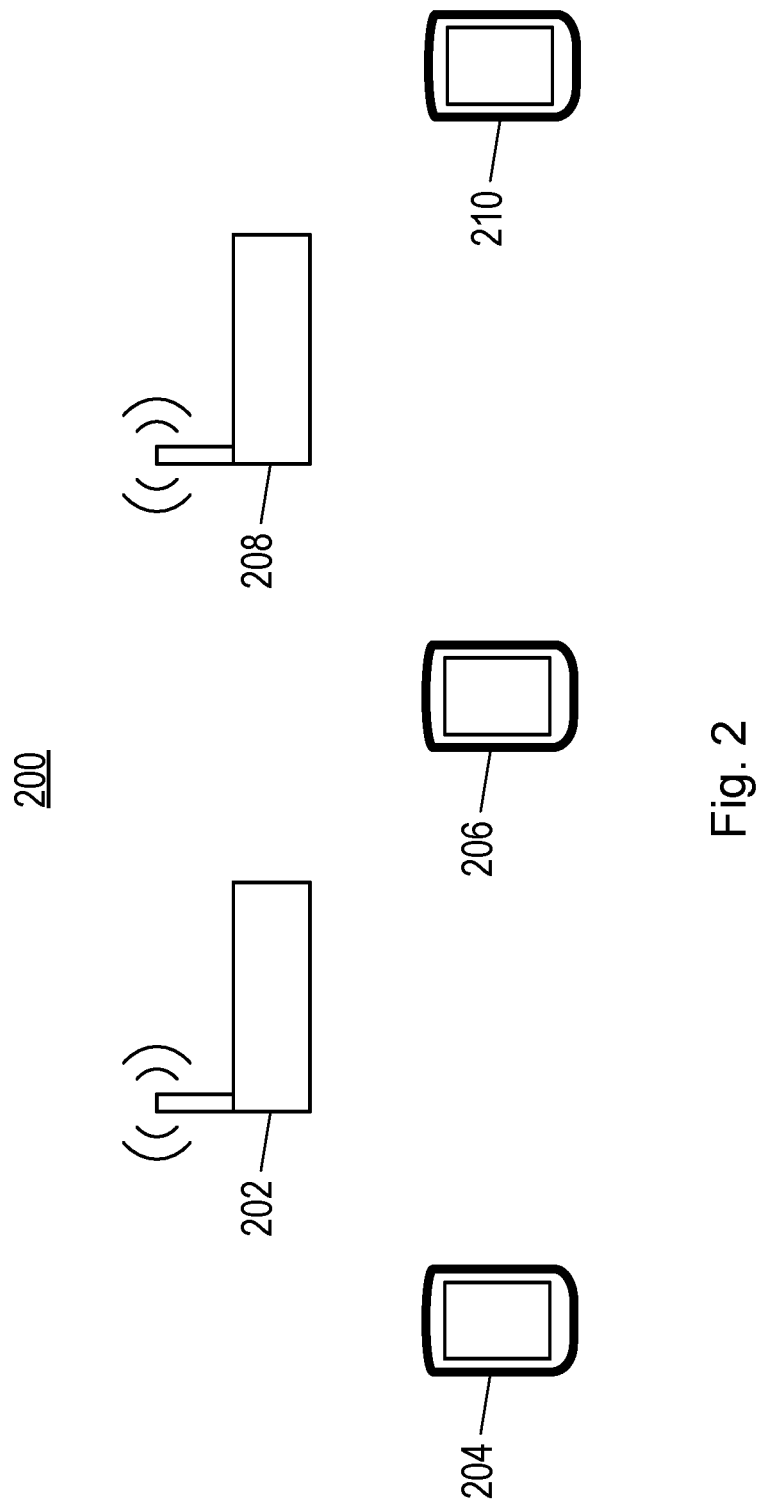
FIG. 2 is a schematic diagram of a communication network according to embodiments of the disclosure.

FIG. 2 shows a wireless communication network 200 according to embodiments of the disclosure. The network 200 comprises a first wireless access point 202 in communication with a first associated station 204 and a second associated station 206, and a second wireless access point 208 in communication with a third associated station 210. In one embodiment, the network 200 implements the IEEE 802.11 standard and may implement one or more of its amendments, and comprises a wireless local area network (WLAN). For convenience, the terminology used herein may correspond to that used in the 802.11 standard (e.g., "access point", "station"). In such embodiments, the first and second stations 204, 206 may belong to the basic service set associated with the first access point 202, while the third mobile station 210 may belong to a basic service set associated with the second access point 208. However, the concepts described herein may also find use in other radio-access technologies. For example, the network 200 may implement cellular radio-access technologies, such as those developed by the $3^{rd}$ Generation Partnership Project (3GPP), e.g., Wideband Code-Division Multiple-Access (WCDMA), Long Term Evolution (LTE), New Radio (NR), etc. In such cases, the wireless access points 202, 208 may be called base stations, NodeBs, eNodeBs, gNodeBs, transmission-reception points (TRPs), etc. The stations 204, 206, 210 may be called a user equipment (UE), a wireless device, a wireless terminal device, etc. The term "node" is used herein to mean any wireless device and any suitable network node.

Although FIG. 2 shows two wireless access points 202, 208 and three mobile stations 204, 206, 210, the concepts set out herein relate to transmissions from one transmitting device to one or multiple receiving devices. Therefore any number of access points and mobile stations may be provided within the network 200 (including a single access point and a single mobile station, or two mobile stations and no access points in the case of direct or sidelink communication). Further, the concepts herein are applicable to uplink and downlink transmissions. In the downlink, the wireless transmitting device comprises an access point and the wireless receiving device or devices comprises one or more stations. In the uplink, the wireless transmitting device comprises a station and the wireless receiving device comprises an access point. Uplink transmissions are usually directed towards a single access point; however, should future standards change, it will be understood that the embodiments described herein are also applicable in the case of a mobile station transmitting to multiple access points. The 802.11 standard frequently uses the acronym "STA" to refer to both stations and access points; without prejudice to the applicability of the concepts described herein to other radio access standards, that convention is also used in parts of the following description.

The network 200 implements a radio access standard or technology in which transmitting devices contend for access to the wireless transmission medium (e.g., IEEE 802.11, unlicensed spectrum use in cellular networks such as Licensed-Assisted Access (LAA) and New Radio Unlicensed (NR-U), etc). Upon winning the contention, a transmitting device is permitted to transmit using the wireless access medium for a defined period or window of time. This window of time may be known as a transmission opportunity (TXOP).

As noted above, the transmission medium is a limited resource and it is therefore important for it to be used efficiently. In order to achieve this, according to embodiments of the disclosure, a wireless transmitting device transmits during the window of time using different types of preamble. For example, in a first, initial transmission in the window of time (which may define the start of the window of time), the wireless transmitting device may utilize a first preamble, whereas in a second, subsequent transmission in the same window of time, the wireless transmitting device may utilize a second preamble which is shorter than the first preamble, or no preamble at all.

Similarly, a wireless receiving device receives a first, initial transmission in a window of time having a first preamble, and then receives a second, subsequent transmission in the window of time having a second, shorter preamble or no preamble at all. The wireless receiving device may also transmit (e.g., acknowledgement messages) in the window of time, utilizing the second preamble or no preamble.

These and other concepts are described in more detail in the figures below.

Figure 3:
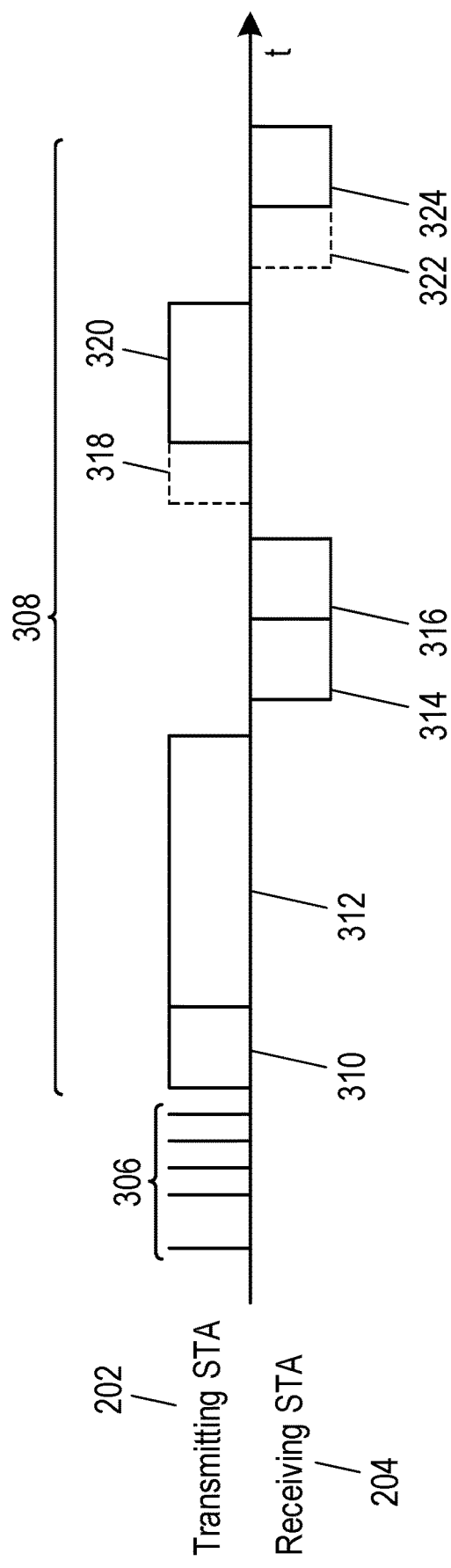
FIG. 3 is a schematic diagram showing signalling during a transmission opportunity according to embodiments of the disclosure.

FIG. 3 is a schematic diagram showing signalling during a transmission opportunity according to embodiments of the disclosure. The signalling is shown between a wireless transmitting device, which is given the reference numeral 202 and thus corresponds to the access point 202 described above, and a wireless receiving device 204, which is given the reference numeral 204 and thus corresponds to the station 204. As noted above, however, the signalling is equally applicable to uplink transmissions and also sidelink transmissions, i.e. device-to-device transmissions. The signalling is also applicable for transmissions to multiple receiving devices (e.g., via multi-user MIMO).

In the illustrated scenario, the wireless transmitting device 202 has data (e.g., user data) to transmit to the wireless receiving device 204. The signalling begins, optionally with a backoff procedure 306. For example, in the IEEE 802.11 Enhanced Distributed Channel Access (EDCA), the wireless transmitting device first listens to the wireless transmission medium, also known as the transmission or broadcast channel, to determine if another device is transmitting using the medium (e.g., on the same transmission frequencies). If the wireless transmission medium is detected as "busy", i.e., one or more other devices are transmitting, the wireless transmitting device holds the transmission until the wireless transmission medium is detected as "idle". Then, it starts the backoff procedure: it continues to listen for a random duration, the "backoff period".

If at any time during the backoff period the wireless transmission medium is detected as "busy", i.e., one or more other devices are transmitting, the wireless transmitting device stores the duration of the remaining backoff period and holds the transmission until the wireless transmission medium is detected as "idle" again. Then, it continues the backoff procedure for the remaining backoff period.

If the wireless transmission medium remains idle until the end of the current backoff period, the wireless transmitting device is allowed to start a window of time (also named transmission opportunity (TXOP)) in which it may transmit one or more data packets without another backoff procedure.

Thus, a first transmission is performed by the wireless transmitting device 202. The first transmission is the initial transmission in a window of time (or transmission opportunity) 308 in which the wireless transmitting device is permitted to access the wireless transmission medium without performing further backoff procedures. The first transmission may define the start of the window of time 308. Other wireless transmitting devices in the vicinity of the wireless transmitting device 202 may refrain from using the wireless transmission medium for the duration of the window of time 308. The duration of the window 308 may be determined based on the access category of the data to be transmitted.

The first transmission comprises a first preamble 310 and a payload 312. For example, the first transmission may comprise or correspond to a data packet, such as a physical layer convergence protocol (PLOP) protocol data unit (PPDU). In this case, the data packet comprises the first preamble 310 and the payload 312. The payload 312 may comprise user data or a request to send (RTS) message, for example.

The first preamble 310 comprises one or more fields which permit the receiving device 204 to decode the first transmission (and particularly the payload 312).

For example, the first preamble 310 may comprise one or more training fields which enable the receiving device 204 perform one or more of: time synchronization with the transmitting device 202; transmission frequency estimation (e.g., carrier frequency offset); and channel estimation. In particular, the first preamble 310 may comprise one or more short training fields (STFs), which comprise multiple repetitions of a known sequence and enable time synchronization and coarse transmission frequency estimation. The first preamble 310 may additionally or alternatively comprise one or more long training fields (LTFs), which comprise a known sequence which is longer than that of the STFs, and which enable the receiving device 204 to perform fine transmission frequency estimation and channel estimation.

The first preamble 310 may additionally or alternatively comprise one or more signalling fields (SIG) comprising information relating to the encoding of the first transmission. For example, the SIG fields may comprise indications of one or more of: the modulation and coding scheme used in the first transmission; the length of the first transmission, etc.

The fields of the first preamble 310 may correspond to multiple versions of the radio access standard implemented in the network 200. For example, the first preamble 310 may comprise one or non-legacy fields (such as non-legacy STFs, non-legacy LTFs and/or non-legacy SIG fields) and also one or more legacy fields (such as legacy STFs, legacy LTFs and/or legacy SIG fields). The non-legacy fields are compliant with a first version of the radio access standard, while the legacy fields are compliant with a version or versions which precede the first version of the radio access standard. In this way, wireless receiving devices which implement earlier versions of the standard are still able to communicate with more advanced transmitting devices.

Figure 4:
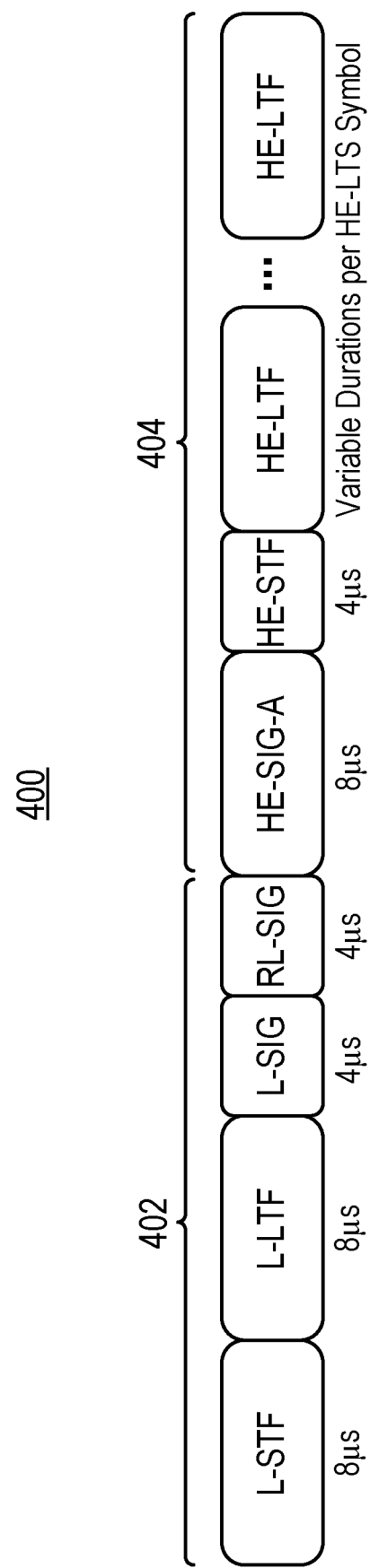
FIG. 4 is a schematic diagram of a preamble.

FIG. 4 is a schematic diagram of a preamble 400 which may be utilized as the first preamble 310. The preamble 400 comprises several legacy fields 402 as well as several non-legacy fields 404. The legacy fields 402 comprise a legacy STF (L-STF), a legacy LTF (L-LTF), a legacy SIG field (L-SIG) and a repeat of the L-SIG (RL-SIG). The non-legacy fields comprise a non-legacy SIG field (HE-SIG-A), a non-legacy STF (HE-STF) and a non-legacy LTF (HE-LTF).

Those skilled in the art will appreciate that the non-legacy fields shown in FIG. 4 are named by convention according to the particular amendment to the radio access standard with which they are associated. In the illustrated embodiment, the non-legacy fields are given the acronym "HE", which corresponds to high efficiency. Other acronyms which may be used for non-legacy fields may be "HT", for high throughput, or "EHT" for extremely high throughput.

It will be noted that the fields 402, 404 may have different durations. Each field may have a different duration to other fields in the preamble 400. For example, the non-legacy LTF may have a duration which depends on the number of spatial layers in the transmission; the duration may correspond to an integer multiple of the number of spatial layers, or the parts of the non-legacy LTF for each spatial layer may differ.

Returning to FIG. 3, and the wireless receiving device 204 responds with its own response transmission. The response transmission comprises a preamble 314 and a second payload 316.

For example, the second payload 316 may be an acknowledgement of successful or unsuccessful receipt of the first transmission, e.g., ACK/NACK (particularly where the first payload 312 comprises user data), or a clear-to-send message (particularly where the first payload 312 comprises an RTS message). The CTS message is sent when the wireless receiving device 204 receives the RTS message, listens to the transmission medium itself, and determines that the medium is idle. In this way, the state of the wireless transmission medium in the vicinity of the wireless receiving device 204 may also be taken into account when transmitting data.

The signalling continues, with the wireless transmitting device 202 transmitting a second transmission comprising a respective preamble 318 and a respective payload 320. Again, the second transmission may comprise a data packet, such as a PPDU. Particularly where the first payload 312 comprises user data and the response 316 comprises an acknowledgement, the payload 320 of the second transmission may comprise a re-transmission of any codewords from the first payload 312 which were not correctly received by the wireless receiving device 204. Where the first payload 312 comprises a RTS message and the response 316 comprises a CTS message, the payload 320 of the second transmission may comprise user data transmitted for the first time. The wireless receiving device 204 responds again with a further response transmission, comprising a preamble 322 and a payload 324. In this instance, the payload 324 comprises an acknowledgement message relating to the second transmission by the wireless transmitting device 202. With this, the time window ends 308 and the wireless transmitting device 202 must re-contend for access to the wireless transmission medium for any further transmissions.

It will be noted that the preambles 318, 322 have a shorter duration (i.e. is transmitted over a shorter amount of time) than the initial preambles 310, 314 transmitted by the wireless transmitting device 202 and the wireless receiving device 204 respectively. It will further be noted that each of the preambles 318, 322 is shown in dashed lines in FIG. 3. This indicates that these preambles are optional. In some embodiments, the preambles 318, 322 may be omitted entirely.

As the transmissions within the time window 308 take place a short inter-frame space (SIFS) after an ACK, as shown in FIG. 3, the wireless receiving device 204 knows the time of arrival of the second transmission by the wireless transmitting device 202. Moreover, the wireless receiving device 204 may be able to re-use some or all of the receiver settings from the first, initial transmission, including one or more of: the automatic gain control (AGC) settings, carrier frequency offset estimation, channel estimate and time synchronization. Depending on which receiver settings are re-used, the STFs and LTFs may be omitted in preambles which are subsequent to the initial transmission. Further, as the subsequent transmissions are protected from the Network Allocation Vector (NAV) setting from the initial frame exchange of the time window 308, the legacy fields may also be omitted.

Even further, when the subsequent transmission is a re-transmission of data (e.g., due to unsuccessful transmission and a corresponding NACK from the wireless receiving device 204), the wireless receiving device 204 knows which codewords it has requested to be re-transmitted. Thus the wireless receiving device 204 knows the length of the subsequent transmission, and the SIG fields (legacy and/or non-legacy) may also be shortened or omitted entirely if other parameters usually indicated in the SIG fields can be assumed or indicated via an alternative mechanism. These possibilities are discussed in greater detail below with respect to FIGS. 5 and 7.

Similarly, the wireless transmitting device 202 is able to re-use information from the first preamble 314 transmitted by the wireless receiving device 204 such that the preambles of subsequent transmissions by the wireless receiving device 204 may be shortened or omitted entirely.

FIG. 3 shows two transmissions by the wireless transmitting device 202 and corresponding responses by the wireless receiving device 204 during the time window. However, those skilled in the art will appreciate that different numbers of transmissions may occur. According to embodiments of the disclosure, the longer first preamble is used for the initial transmission by the wireless transmitting device 202 in the time window 308, and the shorter (or non-existent) second preamble is used for all subsequent transmissions by the wireless transmitting device 202 in the time window 308 (and similarly for transmissions by the wireless receiving device 204).

Figure 5:
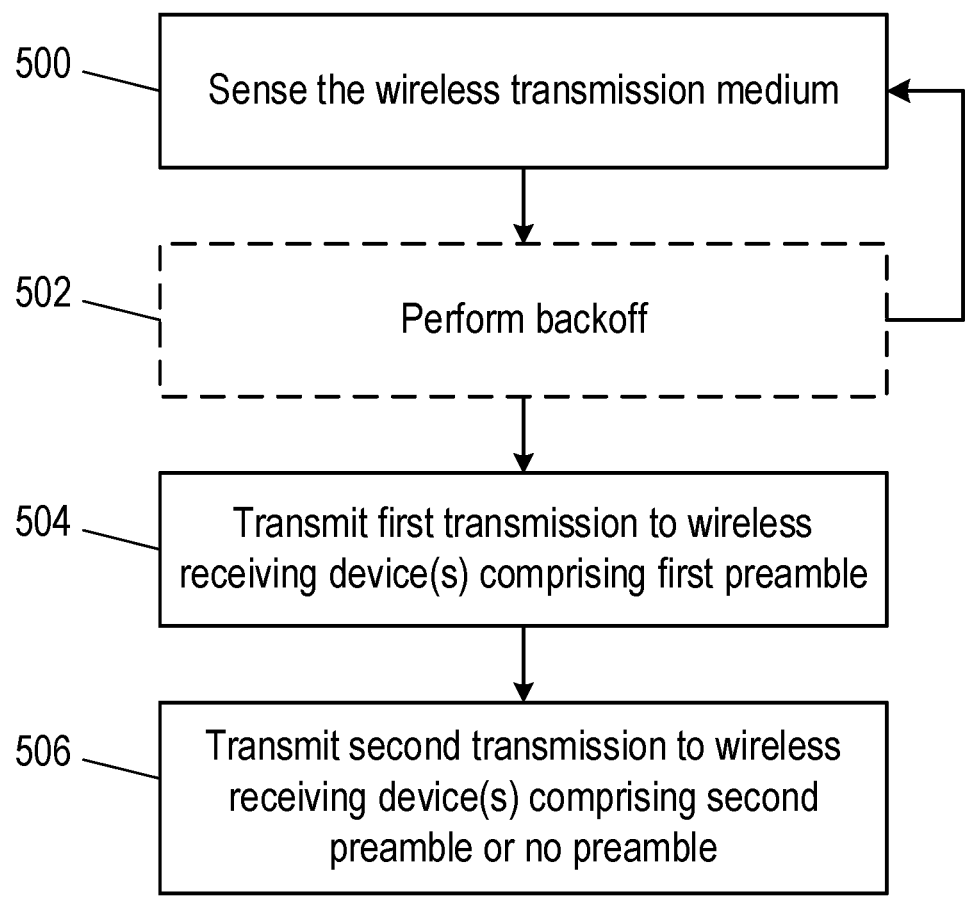
FIG. 5 is a flowchart of a method performed by a wireless transmitting device according to embodiments of the disclosure.

FIG. 5 is a flowchart of a method performed by a wireless transmitting device according to embodiments of the disclosure. The wireless transmitting device may be a mobile station (in the case of uplink or sidelink transmissions) or an access point (in the case of downlink transmissions). Thus the wireless transmitting device may correspond respectively to the mobile station 204 or the access point 202 described above.

The method is set in the context of a wireless transmitting device which has data to transmit to one or more wireless receiving devices. The method begins in step 500, in which the wireless transmitting device (responsive to a determination that it has data to transmit) senses the wireless transmission medium (e.g., the broadcast channel or carrier) to determine whether it is busy or idle. If the wireless transmission medium is busy, the wireless transmitting device performs a backoff procedure in step 502. The backoff procedure may comprise the wireless transmitting device refraining from transmitting for a period of time (which may be randomly determined). Once the period of time has elapsed, the method reverts to step 500 and the wireless transmitting device re-senses the wireless transmission medium to determine whether it is idle or busy. If the transmission medium remains busy, backoff is performed again in step 502 and this process may be repeated as often as necessary until the transmission medium is determined to be idle.

Once the transmission medium is determined to be idle, the method proceeds to step 504, in which the wireless transmitting device transmits a first, initial transmission to the one or more wireless receiving devices. The first transmission belongs to a time window (e.g., a transmission opportunity) in which the wireless transmitting device is permitted to transmit using the wireless transmission medium without re-sensing the medium (i.e. as described in step 500) or performing backoff (i.e. as described in step 502). Other wireless devices in the vicinity, which are able to detect the first transmission but are not an intended recipient, may refrain from transmitting using the transmission medium for the duration of the time window. In one embodiment, the first transmission defines the start of the time window.

The first transmission comprises a first preamble, and may also comprise a payload. The payload may comprise user data or a request-to-send (RTS) message, for example.

The first preamble may comprise one or more fields which permit the receiving device(s) to decode the first transmission (and particularly the payload).

For example, the first preamble may comprise one or more training fields which enable the receiving device(s) to perform one or more of: time synchronization with the transmitting device; transmission frequency estimation (e.g., carrier frequency offset); and channel estimation. In particular, the first preamble may comprise one or more short training fields (STFs), which comprise multiple repetitions of a known sequence and enable time synchronization and coarse transmission frequency estimation. The first preamble may additionally or alternatively comprise one or more long training fields (LTFs), which comprise a known sequence which is longer than that of the STFs, and which enable the receiving device to perform fine transmission frequency estimation and channel estimation.

The first preamble may additionally or alternatively comprise one or more signalling fields (SIG) comprising information relating to the encoding of the first transmission. For example, the SIG fields may comprise indications of one or more of: the modulation and coding scheme used in the first transmission; the length of the first transmission, etc.

The fields of the first preamble may correspond to multiple versions of the radio access standard implemented in the network in which the wireless devices operate. For example, the first preamble may comprise one or non-legacy fields (such as non-legacy STFs, non-legacy LTFs and/or non-legacy SIG fields) and also one or more legacy fields (such as legacy STFs, legacy LTFs and/or legacy SIG fields). The non-legacy fields are compliant with a first version of the radio access standard, while the legacy fields are compliant with a version or versions which precede the first version of the radio access standard. In this way, wireless receiving devices which implement earlier versions of the standard are still able to communicate with more advanced transmitting devices.

In one embodiment, the first preamble may correspond to the preambles 310, 400 described above with respect to FIGS. 3 and 4.

Optionally, the wireless transmitting device may receive a response transmission or transmissions from the one or more wireless receiving devices. Where the first transmission comprises user data, for example, the response transmission or transmissions may comprise acknowledgement messages (ACK/NACK) identifying which parts of the data were correctly received and which parts of the data were not correctly received (if any). Where the first transmission comprises an RTS message, for example, the response transmission or transmissions may comprise CTS messages.

In step 506, the wireless transmitting device performs a second transmission in the time window. The second transmission comprises a payload, which may be, for example, a retransmission of data transmitted in step 504 (e.g., where the response message comprises an acknowledgement message) or user data which is transmitted for the first time. The second transmission may be directed to the same wireless receiving device(s) as the first transmission, or a subset of those devices (e.g., where the second transmission comprises a re-transmission of data which was unsuccessfully received by only a subset of the original recipients).

The second transmission further comprises a second preamble or no preamble at all. Where the second transmission comprises a second preamble, the second preamble is shorter than the first preamble. For example, the second preamble may be transmitted over a shorter time period. The second preamble may have fewer fields than the first preamble. One of more of the fields in the first preamble may be omitted from the second preamble.

For example, one or more or all of the legacy fields present in the first preamble maybe omitted from the second preamble. That is, one or more or all of the L-STF, the L-LTF, the L-SIG and the RL-SIG fields may be omitted from the second preamble.

Alternatively or additionally, the training fields (e.g., the STF and/or the LTF) may be omitted from the second preamble. The omitted training fields may be legacy and/or non-legacy training fields. In such embodiments, the wireless receiving device(s) may be able to re-use receiver settings based on the first preamble (e.g., one or more of the AGC settings, carrier frequency offset, time synchronization, and channel estimate).

Thus in one embodiment the only remaining field in the second preamble is the non-legacy SIG field (e.g., HE-SIG-A in FIG. 4). However, in other embodiments, the SIG field (legacy and/or non-legacy) may alternatively or additionally be omitted from the second preamble.

For example, when the second transmission is a re-transmission of data (e.g., due to unsuccessful transmission and a corresponding NACK from one or more wireless receiving devices), the wireless receiving device(s) have knowledge of the codewords which are to be re-transmitted. Thus the wireless receiving device(s) know the length of the subsequent transmission, and the SIG fields (legacy and/or non-legacy) may be shortened by omitting this information.

In a further embodiment, particularly where the second transmission comprises a retransmission of data contained in the first transmission, the second transmission (particularly the payload) may use the same encoding parameters (e.g., modulation and coding scheme, etc) as the first transmission. Thus the SIG field may be omitted from the second preamble as it contains redundant information. The wireless receiving device(s) may be configured to respond to the absence of a SIG field in the second preamble by assuming that the same encoding parameters from the SIG field in the first transmission are applied to the second transmission.

In an alternative embodiment, to allow for different encoding parameters to be used in the second transmission, the wireless receiving device(s) may signal an indication of the desired encoding parameters in the response transmission to the first transmission (e.g., the ACK/NACK message). Such an indication may be provided in the response transmission in addition to the ACK/NACK information. For example, the wireless receiving device(s) may transmit an indication that the retransmission (the second transmission) be transmitted using a more robust modulation and/or coding, based on the estimated number of errors in the first transmission.

In a further embodiment, one or more or all of the encoding parameters usually contained in the SIG field in the preamble may be provided in the payload of the second transmission (e.g., in the first OFDM symbol thereof). Using 802.11ax numerology as an example, with 20 MHz bandwidth, 48 subcarriers are allocated to control signaling, while the remaining 194 subcarriers are allocated to data. The positions of the subcarriers used for signaling are known a-priori at the wireless receiving device(s), while a preconfigured MCS may be assumed (e.g. the same MCS as indicated in the SIG field of the first transmission). In this way, the control signaling subcarriers carry the information necessary for the wireless receiving device(s) to decode the second transmission (e.g., a retransmission), combine the soft bits from the re-transmitted codewords with the soft bits from the first transmission and attempt to decode the codewords erroneously received in the first transmission.

In a further alternative embodiment, the encoding parameters usually contained in the SIG field of the preamble may be preconfigured between the wireless transmitting device and the wireless receiving device(s). For example, the parameters to be used may be configured when setting up an automatic repeat request (ARQ) process (which may be a hybrid ARQ or a block ARQ process, for example).

Figure 6:
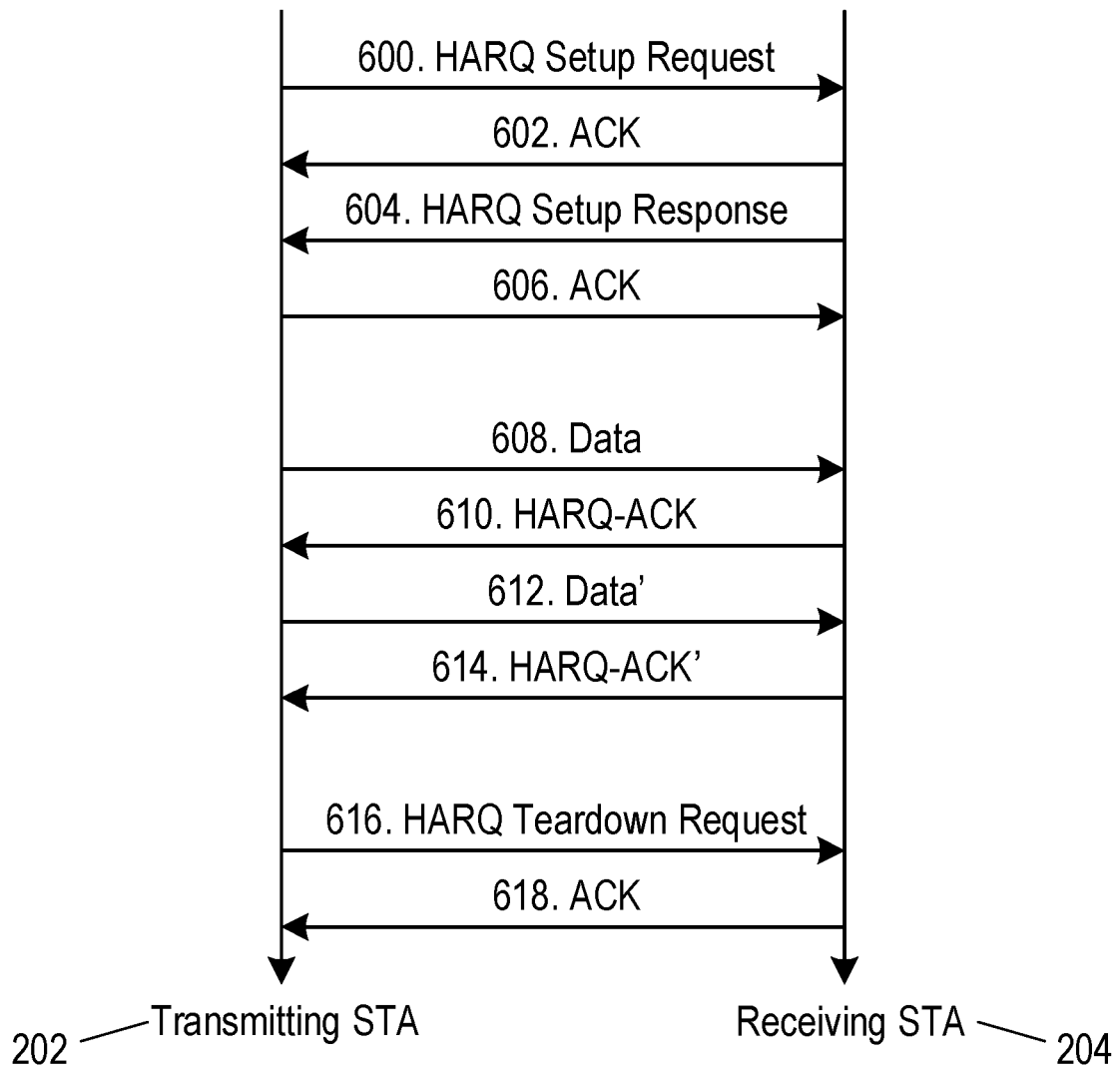
FIG. 6 is a signalling diagram showing establishment of a HARQ process.

FIG. 6 is a signalling diagram showing establishment and use of a HARQ process. The wireless transmitting device (also termed an originator in this context) 202 transmits a HARQ Setup Request message 600 to the wireless receiving device (also termed the recipient in this context) 204. The wireless receiving device 204 transmits an acknowledgement message 602, and then responds with a HARQ Setup Response message 604 to confirm that the HARQ process is established. The wireless transmitting device 202 responds with an acknowledgement message 606. Thereafter, data 608 is transmitted by the wireless transmitting device 202 to the wireless receiving device 204, and corresponding HARQ ACK packets 610 are transmitted by the wireless receiving device 204 to the wireless transmitting device 202. Where a codeword is incorrectly received (indicated NACK), a subsequent transmission 612 may comprise a re-transmission of the incorrectly received data. FIG. 6 shows only two transmissions of data from the wireless transmitting device 202 to the wireless receiving device 204, but of course there may be any number of transmissions using the HARQ process. Once transmissions are finished, the wireless transmitting device 202 transmits a HARQ Teardown Request message 616 to the wireless receiving device 204, and this is acknowledged with an acknowledgement message 618. Thereafter the HARQ process is torn down.

In the context of the present disclosure, the first transmission of data 608 corresponds to the first transmission in step 504 described above. The second transmission of data 612 (which may be a re-transmission) corresponds to the second transmission in step 506. The HARQ Setup Request message 600 may comprise indications of the encoding parameters (e.g., modulation- and coding scheme (MCS)) which will be used for the second transmissions (or any re-transmissions). Thus this information can be omitted from the second preamble.

Thus in some embodiments the SIG field may be omitted from the second preamble. In one example, the second preamble may comprise only a short training field (whether a legacy or non-legacy), to facilitate re-tuning of the AGC parameters and timing acquisition for the second transmission.

In a yet further example, the second preamble may comprise only legacy fields (e.g., one or more or all of the L-STF, L-LTF and L-SIG. In such embodiments, legacy wireless devices not involved in the signalling between the wireless transmitting device and the wireless receiving device(s) are thus able to decode the second preamble and may backoff (i.e. refrain from transmission) accordingly.

One problem associated with the shortened or missing second preamble is that the accuracy of the channel estimates degrades with time due to time variations in the channel. Thus, particularly if the first transmission has a long duration, re-use of the channel estimates from the first preamble to decode the retransmission may lead to degraded performance. To alleviate this issue, the wireless transmitting device may insert a midamble at or near the end of the first transmission (e.g., as defined in IEEE 802.11ax). The midamble comprises one or more LTFs which allow the wireless receiving device(s) to re-estimate the channel shortly (e.g., just a few tens of microseconds) prior to the arrival of the second transmission.

The different described solutions are not only applicable to the transmission, but also to the ACK packets following the initial ACK. Using the same solutions as described above, the preamble of the second (and subsequent) ACK packets can either be omitted or reduced.

It was noted above that the second transmission may be directed to only a subset of the wireless receiving devices to which the first transmission was directed. This situation may occur, for example, when the first transmission contains data that is incorrectly received by a subset of the wireless receiving devices, such that the second transmission, a re-transmission, is directed to that subset of devices. In this case, it will be understood by those skilled in the art that the retransmission may additionally be directed towards one or more further wireless receiving devices to whom the first transmission was not directed. For example, the second transmission may comprise retransmitted data for the subset of devices who failed to receive the data in the first transmission, and also additional data for the one or more further wireless receiving devices. The one or more further wireless receiving devices may nonetheless have received the first transmission, processed the first preamble and subsequently determined that the first transmission was not intended for them. Thus the one or more further wireless receiving devices have knowledge of one or more of: the channel estimate, the time synchronization, the carrier frequency offset and the AGC settings, and can re-use that information to decode the second transmission (which has the second preamble or no preamble).

Thus it can be seen that the method described above corresponds substantially to the signalling of the wireless transmitting device 202 in FIG. 3, for example. Those skilled in the art will appreciate that the method described above also applies to the signalling of the wireless receiving device 204 in FIG. 3. That is, a wireless device may receive multiple data transmissions from a wireless transmitting device and transmit corresponding acknowledgement messages during a time window or transmission opportunity associated with the wireless transmitting device. The first such acknowledgement message may comprise a first, relatively long preamble, whereas as subsequent messages may comprise a second, relatively short preamble or no preamble.

Figure 7:
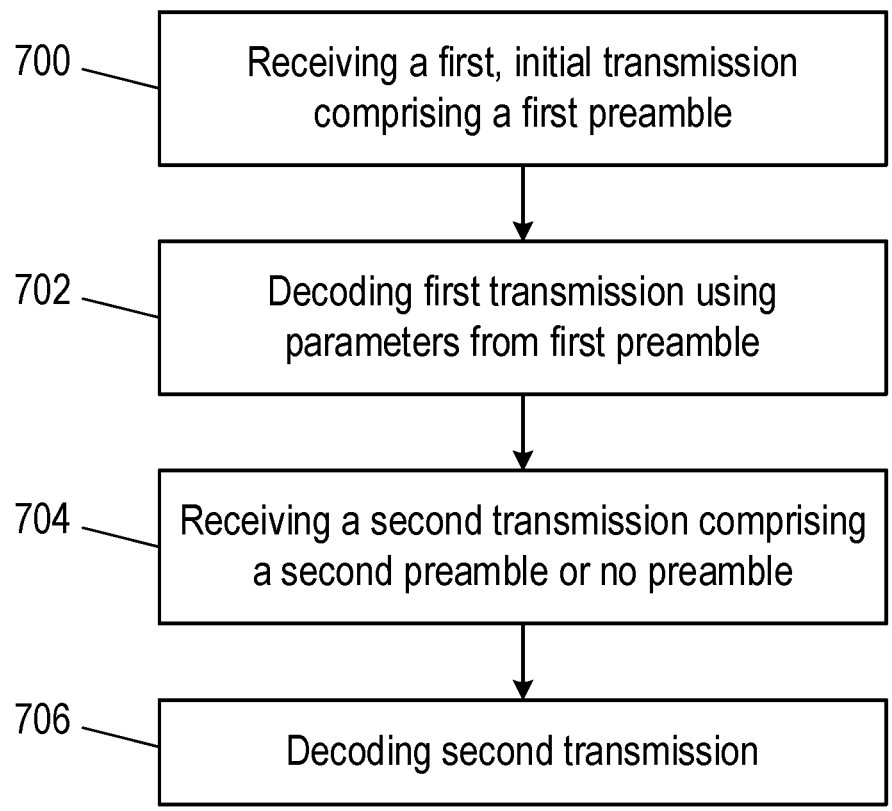
FIG. 7 is a flowchart of a method performed by a wireless receiving device according to embodiments of the disclosure.

FIG. 7 is a flowchart of a method performed by a wireless receiving device according to embodiments of the disclosure. The wireless receiving device may be a station (in the case of downlink or sidelink transmissions) or an access point (in the case of uplink transmissions). Thus the wireless receiving device may correspond respectively to the mobile station 204 or the access point 202 described above. The method may further correspond to the signalling of the wireless receiving device 204 in FIG. 3, for example.

In step 700, the wireless receiving device receives a first, initial transmission from a wireless transmitting device. The first transmission belongs to a time window (e.g., a transmission opportunity) in which the wireless transmitting device is permitted to transmit using the wireless transmission medium without re-sensing the medium (i.e. as described in step 500 above) or performing backoff (i.e. as described in step 502 above). Other wireless devices in the vicinity, which are able to detect the first transmission but are not an intended recipient, may refrain from transmitting using the transmission medium for the duration of the time window. In one embodiment, the first transmission defines the start of the time window.

The first transmission comprises a first preamble, and may also comprise a payload. The payload may comprise user data or a request-to-send (RTS) message, for example.

The first preamble may comprise one or more fields which permit the receiving device(s) to decode the first transmission (and particularly the payload).

For example, the first preamble may comprise one or more training fields which enable the receiving device(s) to perform one or more of: time synchronization with the transmitting device; transmission frequency estimation (e.g., carrier frequency offset); and channel estimation. In particular, the first preamble may comprise one or more short training fields (STFs), which comprise multiple repetitions of a known sequence and enable time synchronization and coarse transmission frequency estimation. The first preamble may additionally or alternatively comprise one or more long training fields (LTFs), which comprise a known sequence which is longer than that of the STFs, and which enable the receiving device to perform fine transmission frequency estimation and channel estimation.

The first preamble may additionally or alternatively comprise one or more signalling fields (SIG) comprising information relating to the encoding of the first transmission. For example, the SIG fields may comprise indications of one or more of: the modulation and coding scheme used in the first transmission; the length of the first transmission, etc.

The fields of the first preamble may correspond to multiple versions of the radio access standard implemented in the network in which the wireless devices operate. For example, the first preamble may comprise one or non-legacy fields (such as non-legacy STFs, non-legacy LTFs and/or non-legacy SIG fields) and also one or more legacy fields (such as legacy STFs, legacy LTFs and/or legacy SIG fields). The non-legacy fields are compliant with a first version of the radio access standard, while the legacy fields are compliant with a version or versions which precede the first version of the radio access standard. In this way, wireless receiving devices which implement earlier versions of the standard are still able to communicate with more advanced transmitting devices.

In one embodiment, the first preamble may correspond to the preambles 310, 400 described above with respect to FIGS. 3 and 4.

In step 702, the wireless receiving device attempts to decode the first transmission using the parameters obtained from the first preamble. Thus, the wireless receiving device determines time synchronization and coarse carrier frequency offset estimate based on the one or more short training fields; the wireless receiving device determines a fine carrier frequency offset estimate and a channel estimate based on the one or long training fields; and the wireless device obtains encoding parameters (such as the duration of the packet and the MCS) from one or more signalling fields. With this information, the wireless receiving device is able to decode the payload of the first transmission.

Optionally, the wireless receiving device may transmit a response transmission to the wireless transmitting device. Where the first transmission comprises user data, for example, the response transmission may comprise an acknowledgement message (ACK/NACK) identifying which parts of the data were correctly received and which parts of the data were not correctly received (if any). Where the first transmission comprises a RTS message, for example, the response transmission may comprise a CTS message.

In step 704, the wireless receiving device receives a second transmission in the time window. The second transmission comprises a payload, which may be, for example, a retransmission of data received in step 700 (e.g., where the response message comprises an acknowledgement message) or user data which is transmitted for the first time.

The second transmission further comprises a second preamble or no preamble at all. Where the second transmission comprises a second preamble, the second preamble is shorter than the first preamble. For example, the second preamble may be transmitted over a shorter time period. The second preamble may have fewer fields than the first preamble. One of more of the fields in the first preamble may be omitted from the second preamble.

For example, one or more or all of the legacy fields present in the first preamble maybe omitted from the second preamble. That is, one or more or all of the L-STF, the L-LTF, the L-SIG and the RL-SIG fields may be omitted from the second preamble.

Alternatively or additionally, the training fields (e.g., the STF and/or the LTF) may be omitted from the second preamble. The omitted training fields may be legacy and/or non-legacy training fields. In such embodiments, the wireless receiving device(s) may be able to re-use receiver settings based on the first preamble (e.g., one or more of the AGC settings, carrier frequency offset, time synchronization, and channel estimate).

Thus in one embodiment the only remaining field in the second preamble is the non-legacy SIG field (e.g., HE-SIG-A in FIG. 4). However, in other embodiments, the SIG field (legacy and/or non-legacy) may alternatively or additionally be omitted from the second preamble.

For example, when the second transmission is a re-transmission of data (e.g., due to unsuccessful transmission and a corresponding NACK from the wireless receiving device), the wireless receiving device has knowledge of the codewords which are to be re-transmitted. Thus the wireless receiving device knows the length of the subsequent transmission, and the SIG fields (legacy and/or non-legacy) may be shortened by omitting this information.

In a further embodiment, particularly where the second transmission comprises a retransmission of data contained in the first transmission, the second transmission (particularly the payload) may use the same encoding parameters (e.g., modulation and coding scheme, etc) as the first transmission. Thus the SIG field may be omitted from the second preamble as it contains redundant information. The wireless receiving device may be configured to respond to the absence of a SIG field in the second preamble by assuming that the same encoding parameters from the SIG field in the first transmission are applied to the second transmission.

In an alternative embodiment, to allow for different encoding parameters to be used in the second transmission, the wireless receiving device may signal an indication of the desired encoding parameters in the response transmission to the first transmission (e.g., the ACK/NACK message). Such an indication may be provided in the response transmission in addition to the ACK/NACK information. For example, the wireless receiving device(s) may transmit an indication that the retransmission (the second transmission) be transmitted using a more robust modulation and/or coding, based on the estimated number of errors in the first transmission.

In a further embodiment, one or more or all of the encoding parameters usually contained in the SIG field in the preamble may be provided in the payload of the second transmission (e.g., in the first OFDM symbol thereof). Using 802.11ax numerology as an example, with 20 MHz bandwidth, 48 subcarriers are allocated to control signaling, while the remaining 194 subcarriers are allocated to data. The positions of the subcarriers used for signaling are known a-priori at the wireless receiving device, while a preconfigured MCS may be assumed (e.g. the same MCS as indicated in the SIG field of the first transmission). In this way, the control signaling subcarriers carry the information necessary for the wireless receiving device to decode the second transmission (e.g., a retransmission), combine the soft bits from the re-transmitted codewords with the soft bits from the first transmission and attempt to decode the codewords erroneously received in the first transmission.

In a further alternative embodiment, the encoding parameters usually contained in the SIG field of the preamble may be preconfigured between the wireless transmitting device and the wireless receiving device. For example, the parameters to be used may be configured when setting up an automatic repeat request (ARQ) process (which may be a hybrid ARQ or a block ARQ process, for example). See FIG. 6.

Thus in some embodiments the SIG field may be omitted from the second preamble. In one example, the second preamble may comprise only a short training field (whether a legacy or non-legacy), to facilitate re-tuning of the AGC parameters and timing acquisition for the second transmission.

In a yet further example, the second preamble may comprise only legacy fields (e.g., one or more or all of the L-STF, L-LTF and L-SIG. In such embodiments, legacy wireless devices not involved in the signalling between the wireless transmitting device and the wireless receiving device(s) are thus able to decode the second preamble and may backoff (i.e. refrain from transmission) accordingly.

One problem associated with the shortened or missing second preamble is that the accuracy of the channel estimates degrades with time due to time variations in the channel. Thus, particularly if the first transmission has a long duration, re-use of the channel estimates from the first preamble to decode the retransmission may lead to degraded performance. To alleviate this issue, the wireless transmitting device may insert a midamble at or near the end of the first transmission (e.g., as defined in IEEE 802.11ax). The midamble comprises one or more LTFs which allow the wireless receiving device to re-estimate the channel shortly (e.g., just a few tens of microseconds) prior to the arrival of the second transmission.

The different described solutions are not only applicable to the transmission, but also to the ACK packets following the initial ACK. Using the same solutions as described above, the preamble of the second (and subsequent) ACK packets can either be omitted or reduced.

It was noted above that the second transmission may be directed to only a subset of the wireless receiving devices to which the first transmission was directed. This situation may occur, for example, when the first transmission contains data that is incorrectly received by a subset of the wireless receiving devices, such that the second transmission, a re-transmission, is directed to that subset of devices. In this case, it will be understood by those skilled in the art that the retransmission may additionally be directed towards one or more further wireless receiving devices to whom the first transmission was not directed. For example, the second transmission may comprise retransmitted data for the subset of devices who failed to receive the data in the first transmission, and also additional data for the one or more further wireless receiving devices. The one or more further wireless receiving devices may nonetheless have received the first transmission, processed the first preamble and subsequently determined that the first transmission was not intended for them. Thus the one or more further wireless receiving devices have knowledge of one or more of: the channel estimate, the time synchronization, the carrier frequency offset and the AGC settings, and can re-use that information to decode the second transmission (which has the second preamble or no preamble). In this context, the first transmission received in step 700 is not actually intended for the wireless receiving device, but the wireless receiving device nonetheless decodes first preamble. The wireless receiving device may not attempt to decode the first transmission, however.

In step 706, the wireless receiving device attempts to decode the second transmission using any of the methods described above. For example, the wireless receiving device may re-use information obtained from the first preamble received in step 700, and/or preconfigured information (e.g., as obtained in a HARQ setup process).

Figure 8:
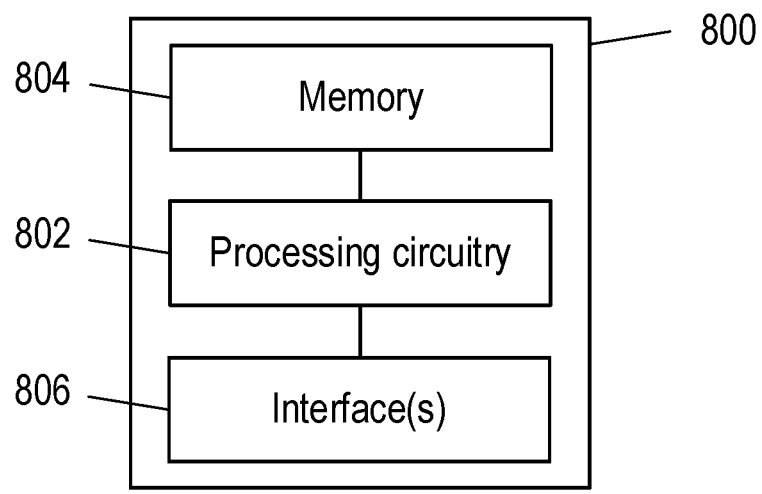
FIGS. 8 and 9 are schematic diagrams of a wireless transmitting device according to embodiments of the disclosure.

FIG. 8 is a schematic diagram of a wireless transmitting device 800 according to embodiments of the disclosure. The wireless transmitting device 800 may be configured to carry out the method described above with respect to FIG. 5, for example. The wireless transmitting device 800 may be, for example, a mobile station such as the mobile station 204 described above (in the example of uplink communications) or an access point or other network node such as the access point 202 (in the example of downlink communications).

The wireless transmitting device is operable in a communication network implementing a standard in which transmitting devices contend for access to a wireless transmission medium, and in which a transmitting device is permitted to transmit using the wireless transmission medium for a window of time (also known as a transmission opportunity) upon winning contention.

The wireless transmitting device 800 comprises processing circuitry 802 and a device-readable medium (such as memory) 804. The device-readable medium 804 stores instructions which, when executed by the processing circuitry 802, cause the wireless transmitting device 800 to: initiate a first, initial transmission to one or more wireless receiving devices in the window of time, the first transmission comprising a first preamble; and, subsequent to the first transmission, initiate a second transmission to one or more wireless receiving devices in the window of time, the second transmission comprising a second preamble which is shorter than the first preamble, or comprising no preamble.

In the illustrated embodiment, the wireless transmitting device 800 also comprises one or more interfaces 806, for receiving signals from other nodes and/or transmitting signals to other nodes. The interfaces 806 may use any appropriate communication technology, such as electronic signalling, optical signalling or wireless (radio) signalling.

Although FIG. 8 shows the processing circuitry 802, the memory 804 and the interface(s) 806 coupled together in series, those skilled in the art will appreciate that the components of the wireless transmitting device 800 may be coupled together in any suitable manner (e.g. via a bus or other internal connection).

Figure 9:
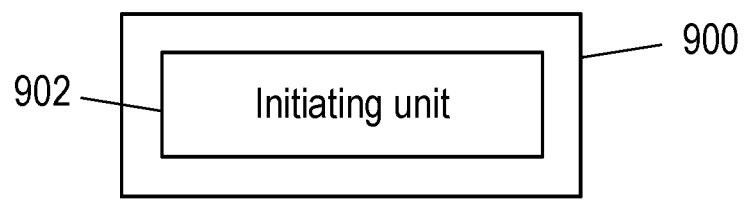

FIG. 9 is a schematic illustration of a wireless transmitting device 900 according to further embodiments of the disclosure. The wireless transmitting device 900 may be configured to perform the method of FIG. 5, for example. The wireless transmitting device 900 may be, for example, a mobile station such as the mobile station 204 described above (in the example of uplink communications) or an access point or other network node such as the access point 202 (in the example of downlink communications).

The wireless transmitting device is operable in a communication network implementing a standard in which transmitting devices contend for access to a wireless transmission medium, and in which a transmitting device is permitted to transmit using the wireless transmission medium for a window of time (also known as a transmission opportunity) upon winning contention.

The wireless transmitting device 900 comprises an initiating unit 902. The initiating unit module 902 is configured to: initiate a first, initial transmission to one or more wireless receiving devices in the window of time, the first transmission comprising a first preamble; and, subsequent to the first transmission, initiate a second transmission to one or more wireless receiving devices in the window of time, the second transmission comprising a second preamble which is shorter than the first preamble, or comprising no preamble.

The wireless transmitting device 900 may also comprise one or more interface modules (not illustrated), for receiving signals from other nodes of the network and/or transmitting signals to other nodes of the network. The interfaces may use any appropriate communication technology, such as electronic signalling, optical signalling or wireless (radio) signalling.

Figure 10:
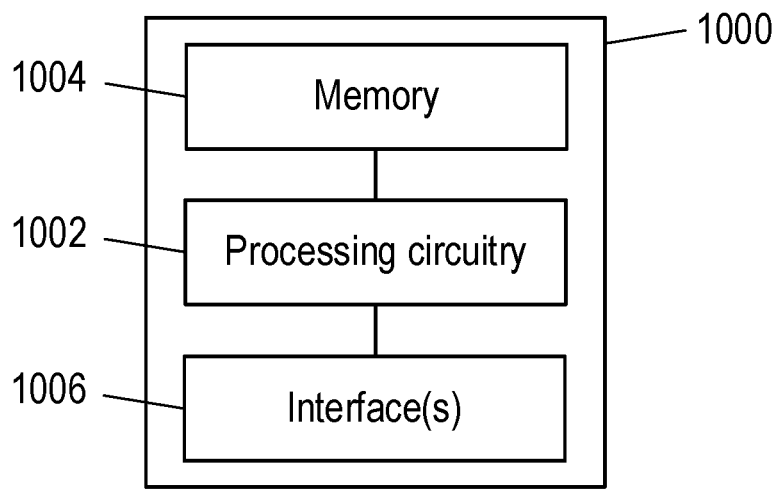
FIGS. 10 and 11 are schematic diagrams of a wireless receiving device according to embodiments of the disclosure.

FIG. 10 is a schematic diagram of a wireless receiving device 1000 according to embodiments of the disclosure. The wireless receiving device 1000 may be configured to carry out the method described above with respect to FIG. 7, for example. The wireless receiving device 1000 may be, for example, a mobile station such as the mobile station 204 described above (in the example of downlink communications) or an access point or other network node such as the access point 202 (in the example of uplink communications).

The wireless receiving device is operable in a communication network implementing a standard in which transmitting devices contend for access to a wireless transmission medium, and in which a transmitting device is permitted to transmit using the wireless transmission medium for a window of time (also known as a transmission opportunity) upon winning contention.

The wireless receiving device 1000 comprises processing circuitry 1002 and a device-readable medium (such as memory) 1004. The device-readable medium 1004 stores instructions which, when executed by the processing circuitry 1002, cause the wireless receiving device 1000 to: receive a first, initial transmission from a wireless transmitting device in the window of time, the first transmission comprising a first preamble; and, subsequent to the first transmission, receive a second transmission from the wireless transmitting device in the window of time, the second transmission comprising a second preamble which is shorter than the first preamble, or comprising no preamble.

In the illustrated embodiment, the wireless receiving device 1000 also comprises one or more interfaces 1006, for receiving signals from other nodes and/or transmitting signals to other nodes. The interfaces 1006 may use any appropriate communication technology, such as electronic signalling, optical signalling or wireless (radio) signalling.

Although FIG. 10 shows the processing circuitry 1002, the memory 1004 and the interface(s) 1006 coupled together in series, those skilled in the art will appreciate that the components of the wireless receiving device 1000 may be coupled together in any suitable manner (e.g. via a bus or other internal connection).

Figure 11:
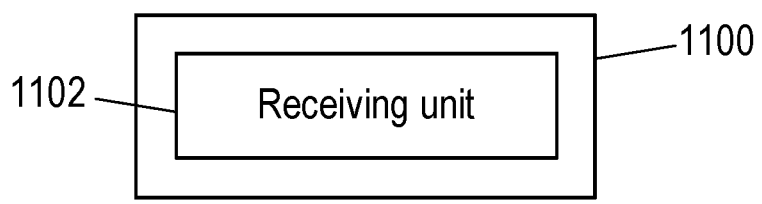

FIG. 11 is a schematic illustration of a wireless receiving device 1100 according to further embodiments of the disclosure. The wireless receiving device 1100 may be configured to perform the method of FIG. 7, for example. The wireless receiving device 1100 may be, for example, a mobile station such as the mobile station 204 described above (in the example of downlink communications) or an access point or other network node such as the access point 202 (in the example of uplink communications).

The wireless receiving device is operable in a communication network implementing a standard in which transmitting devices contend for access to a wireless transmission medium, and in which a transmitting device is permitted to transmit using the wireless transmission medium for a window of time (also known as a transmission opportunity) upon winning contention.

The wireless receiving device 1100 comprises a receiving unit 1102. The receiving unit module 1102 is configured to: receive a first, initial transmission from a wireless transmitting device in the window of time, the first transmission comprising a first preamble; and, subsequent to the first transmission, receive a second transmission from the wireless transmitting device in the window of time, the second transmission comprising a second preamble which is shorter than the first preamble, or comprising no preamble.

The wireless receiving device 1100 may also comprise one or more interface modules (not illustrated), for receiving signals from other nodes of the network and/or transmitting signals to other nodes of the network. The interfaces may use any appropriate communication technology, such as electronic signalling, optical signalling or wireless (radio) signalling.

The modules and units described above with respect to FIGS. 9 and 11 may comprise any combination of hardware and/or software. For example, in an embodiment, the modules are implemented entirely in hardware. As noted above, hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions. In another embodiment, the modules may be implemented entirely in software. In yet further embodiments, the modules may be implemented in combinations of hardware and software.

The present disclosure therefore provides methods, apparatus and device-readable mediums for transmitting and receiving in a communication network. Specifically, a wireless transmitting device is configured to utilize a second, shorter preamble for transmissions within a given transmission opportunity following an initial transmission. In this way, the available time in the transmission opportunity can be used more efficiently for the transmission of data.

Figure 12:
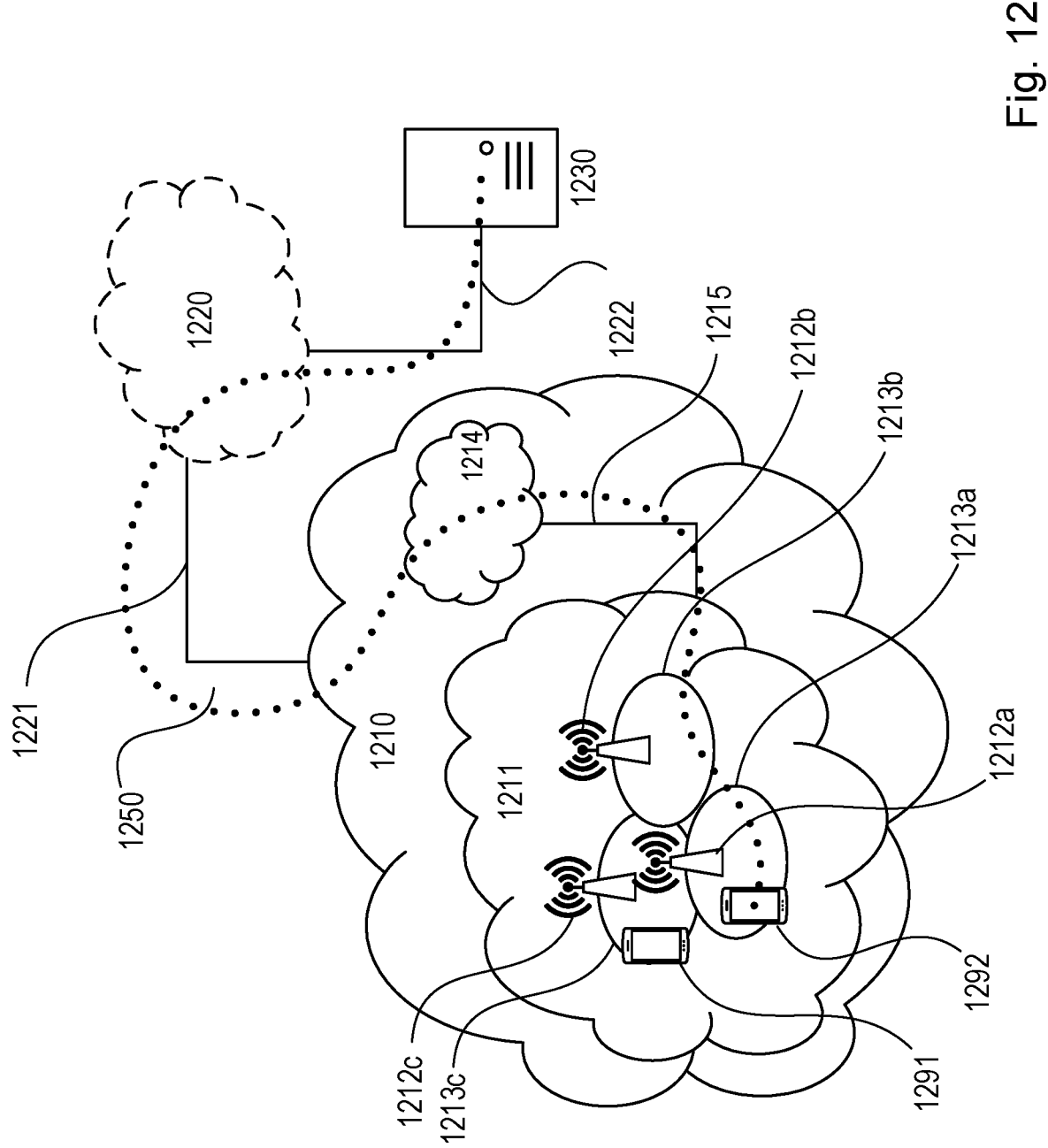
FIG. 12 schematically illustrates a telecommunication network connected via an intermediate network to a host computer.

With reference to FIG. 12, in accordance with an embodiment, a communication system includes a telecommunication network 1210, such as a 3GPP-type cellular network, which comprises an access network 1211, such as a radio access network, and a core network 1214. Alternatively, the telecommunication network 1210 may comprise an access network 1211 such as a wireless local area network (such as the network 200 described above with respect to FIG. 2) and a core network 1214 such as the Internet. The access network 1211 comprises a plurality of access points 1212a, 1212b, 1212c, such as NBs, eNBs, gNBs or other types of wireless access points, each defining a corresponding coverage area 1213a, 1213b, 1213c. Each access point 1212a, 1212b, 1212c is connectable to the core network 1214 over a wired or wireless connection 1215. A first wireless device 1291 located in coverage area 1213c is configured to wirelessly connect to, or be paged by, the corresponding access point 1212c. A second wireless device 1292 in coverage area 1213a is wirelessly connectable to the corresponding access point 1212a. While a plurality of wireless devices 1291, 1292 are illustrated in this example, the disclosed embodiments are equally applicable to a situation where a sole wireless device is in the coverage area or where a sole wireless device is connecting to the corresponding access point 1212.

The telecommunication network 1210 is itself connected to a host computer 1230, which may be embodied in the hardware and/or software of a standalone server, a cloud-implemented server, a distributed server or as processing resources in a server farm. The host computer 1230 may be under the ownership or control of a service provider, or may be operated by the service provider or on behalf of the service provider. The connections 1221, 1222 between the telecommunication network 1210 and the host computer 1230 may extend directly from the core network 1214 to the host computer 1230 or may go via an optional intermediate network 1220. The intermediate network 1220 may be one of, or a combination of more than one of, a public, private or hosted network; the intermediate network 1220, if any, may be a backbone network or the Internet; in particular, the intermediate network 1220 may comprise two or more sub-networks (not shown).

The communication system of FIG. 12 as a whole enables connectivity between one of the connected wireless devices 1291, 1292 and the host computer 1230. The connectivity may be described as an over-the-top (OTT) connection 1250. The host computer 1230 and the connected wireless devices 1291, 1292 are configured to communicate data and/or signaling via the OTT connection 1250, using the access network 1211, the core network 1214, any intermediate network 1220 and possible further infrastructure (not shown) as intermediaries. The OTT connection 1250 may be transparent in the sense that the participating communication devices through which the OTT connection 1250 passes are unaware of routing of uplink and downlink communications. For example, an access point 1212 may not or need not be informed about the past routing of an incoming downlink communication with data originating from a host computer 1230 to be forwarded (e.g., handed over) to a connected wireless device 1291. Similarly, the access point 1212 need not be aware of the future routing of an outgoing uplink communication originating from the wireless device 1291 towards the host computer 1230.

Example implementations, in accordance with an embodiment, of the wireless device, access point and host computer discussed in the preceding paragraphs will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises processing circuitry 1318, which may have storage and/or processing capabilities. In particular, the processing circuitry 1318 may comprise one or more programmable processors, application-specific integrated circuits, field programmable gate arrays or combinations of these (not shown) adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as a wireless device 1330 connecting via an OTT connection 1350 terminating at the wireless device 1330 and the host computer 1310. In providing the service to the remote user, the host application 1312 may provide user data which is transmitted using the OTT connection 1350.

The communication system 1300 further includes an access point 1320 provided in a telecommunication system and comprising hardware 1325 enabling it to communicate with the host computer 1310 and with the wireless device 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with a wireless device 1330 located in a coverage area (not shown in FIG. 13) served by the access point 1320. The communication interface 1326 may be configured to facilitate a connection 1360 to the host computer 1310. The connection 1360 may be direct or it may pass through a core network (not shown in FIG. 13) of the telecommunication system and/or through one or more intermediate networks outside the telecommunication system. In the embodiment shown, the hardware 1325 of the access point 1320 further includes processing circuitry 1328, which may comprise one or more programmable processors, application-specific integrated circuits, field programmable gate arrays or combinations of these (not shown) adapted to execute instructions. The access point 1320 further has software 1321 stored internally or accessible via an external connection.

The communication system 1300 further includes the wireless device 1330 already referred to. Its hardware 1335 may include a radio interface 1337 configured to set up and maintain a wireless connection 1370 with an access point serving a coverage area in which the wireless device 1330 is currently located. The hardware 1335 of the wireless device 1330 further includes processing circuitry 1338, which may comprise one or more programmable processors, application-specific integrated circuits, field programmable gate arrays or combinations of these (not shown) adapted to execute instructions. The wireless device 1330 further comprises software 1331, which is stored in or accessible by the wireless device 1330 and executable by the processing circuitry 1338. The software 1331 includes a client application 1332. The client application 1332 may be operable to provide a service to a human or non-human user via the wireless device 1330, with the support of the host computer 1310. In the host computer 1310, an executing host application 1312 may communicate with the executing client application 1332 via the OTT connection 1350 terminating at the wireless device 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

Figure 13:
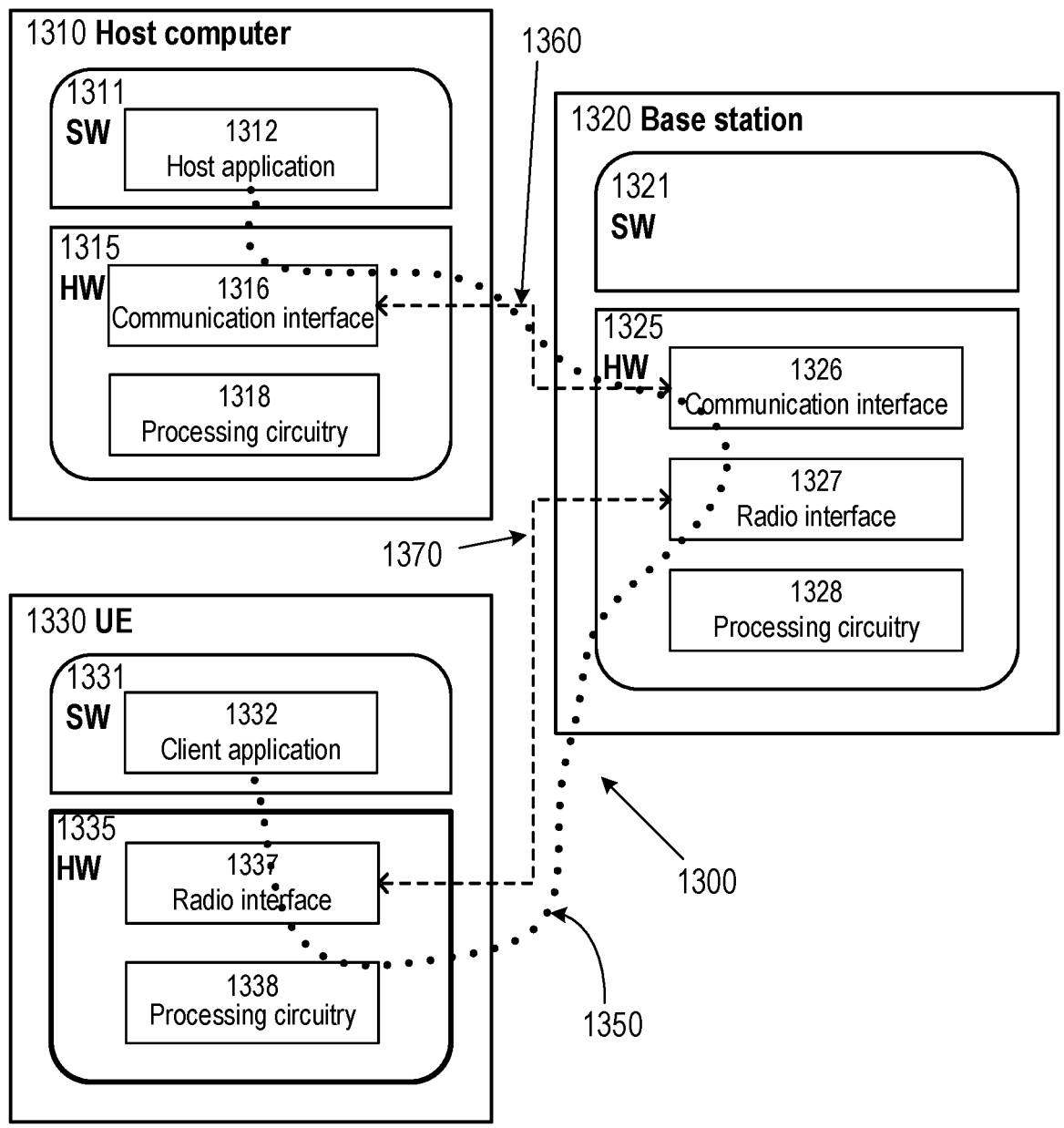
FIG. 13 is a generalized block diagram of a host computer communicating via an access point with a user equipment over a partially wireless connection.

It is noted that the host computer 1310, access point 1320 and wireless device 1330 illustrated in FIG. 13 may be identical to the host computer 3230, one of the access points 3212a, 3212b, 3212c and one of the wireless devices 3291, 3292 of FIG. 12, respectively. This is to say, the inner workings of these entities may be as shown in FIG. 13 and independently, the surrounding network topology may be that of FIG. 12.

In FIG. 13, the OTT connection 1350 has been drawn abstractly to illustrate the communication between the host computer 1310 and the use equipment 1330 via the access point 1320, without explicit reference to any intermediary devices and the precise routing of messages via these devices. Network infrastructure may determine the routing, which it may be configured to hide from the wireless device 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

The wireless connection 1370 between the wireless device 1330 and the access point 1320 is in accordance with the teachings of the embodiments described throughout this disclosure. One or more of the various embodiments improve the performance of OTT services provided to the wireless device 1330 using the OTT connection 1350, in which the wireless connection 1370 forms the last segment. More precisely, the teachings of these embodiments may improve the data rate and thereby provide benefits such as reduced user waiting time and relaxed restriction on file size.

A measurement procedure may be provided for the purpose of monitoring data rate, latency and other factors on which the one or more embodiments improve. There may further be an optional network functionality for reconfiguring the OTT connection 1350 between the host computer 1310 and wireless device 1330, in response to variations in the measurement results. The measurement procedure and/or the network functionality for reconfiguring the OTT connection 1350 may be implemented in the software 1311 of the host computer 1310 or in the software 1331 of the wireless device 1330, or both. In embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of the OTT connection 1350 may include message format, retransmission settings, preferred routing etc.; the reconfiguring need not affect the access point 1320, and it may be unknown or imperceptible to the access point 1320. Such procedures and functionalities may be known and practiced in the art. In certain embodiments, measurements may involve proprietary wireless device signaling facilitating the host computer's 1310 measurements of throughput, propagation times, latency and the like. The measurements may be implemented in that the software 1311, 1331 causes messages to be transmitted, in particular empty or 'dummy' messages, using the OTT connection 1350 while it monitors propagation times, errors etc.

Figure 14:
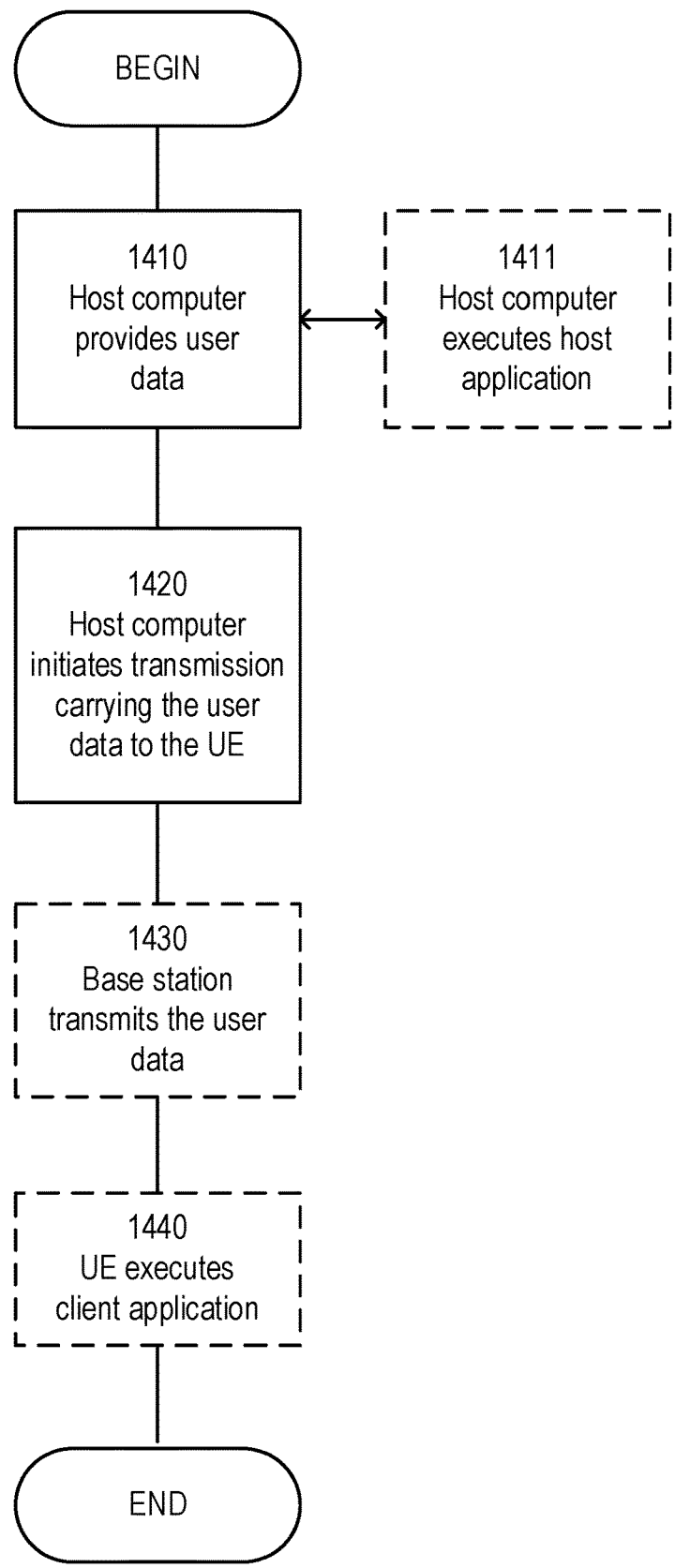
FIGS. 14 to 17 are flowcharts illustrating methods implemented in a communication system including a host computer, an access point and a user equipment.

FIG. 14 is a flowchart illustrating a method implemented in a communication system, in accordance with one embodiment. The communication system includes a host computer, an access point and a wireless device which may be those described with reference to FIGS. 12 and 13. For simplicity of the present disclosure, only drawing references to FIG. 14 will be included in this section. In a first step 1410 of the method, the host computer provides user data. In an optional substep 1411 of the first step 1410, the host computer provides the user data by executing a host application. In a second step 1420, the host computer initiates a transmission carrying the user data to the wireless device. In an optional third step 1430, the access point transmits to the wireless device the user data which was carried in the transmission that the host computer initiated, in accordance with the teachings of the embodiments described throughout this disclosure. In an optional fourth step 1440, the wireless device executes a client application associated with the host application executed by the host computer.

Figure 15:
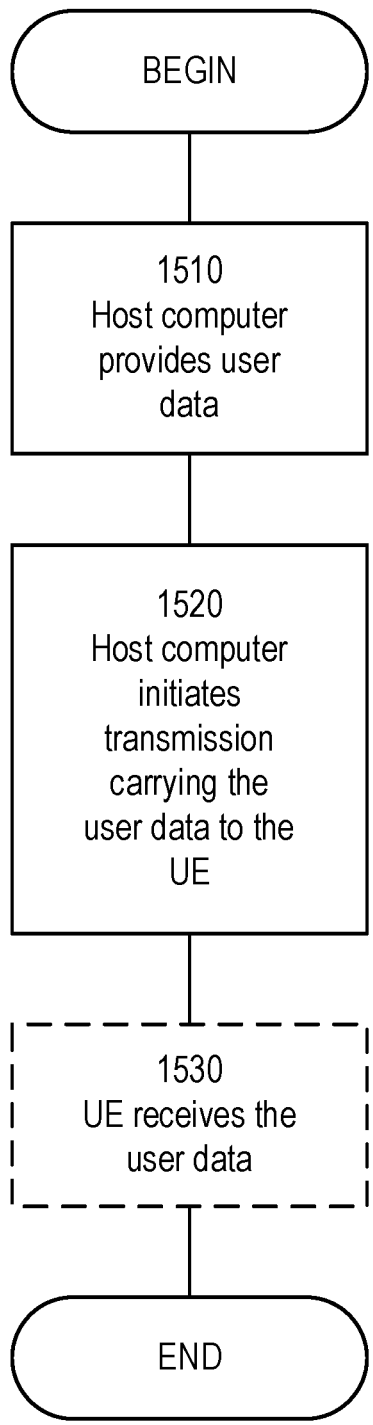

FIG. 15 is a flowchart illustrating a method implemented in a communication system, in accordance with one embodiment. The communication system includes a host computer, an access point and a wireless device which may be those described with reference to FIGS. 12 and 13. For simplicity of the present disclosure, only drawing references to FIG. 15 will be included in this section. In a first step 1510 of the method, the host computer provides user data. In an optional substep (not shown) the host computer provides the user data by executing a host application. In a second step 1520, the host computer initiates a transmission carrying the user data to the wireless device. The transmission may pass via the access point, in accordance with the teachings of the embodiments described throughout this disclosure. In an optional third step 1530, the wireless device receives the user data carried in the transmission.

Figure 16:
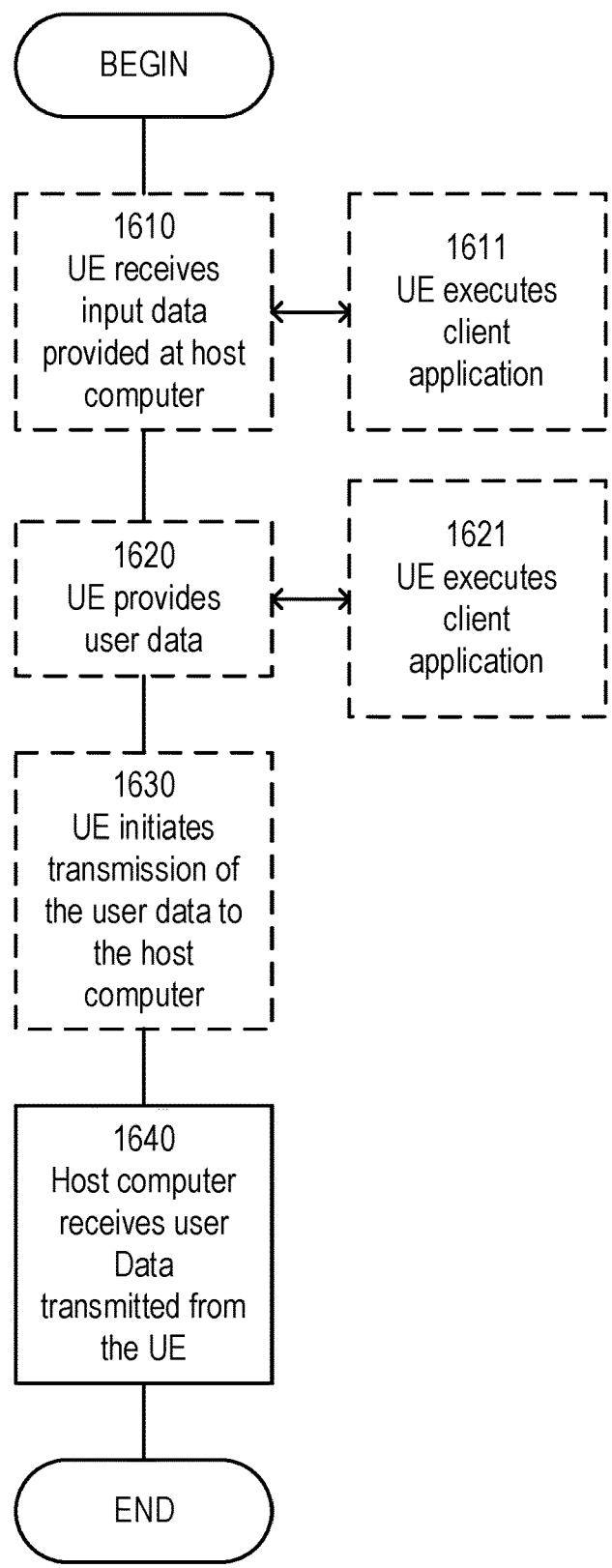

FIG. 16 is a flowchart illustrating a method implemented in a communication system, in accordance with one embodiment. The communication system includes a host computer, an access point and a wireless device which may be those described with reference to FIGS. 12 and 13. For simplicity of the present disclosure, only drawing references to FIG. 16 will be included in this section. In an optional first step 1610 of the method, the wireless device receives input data provided by the host computer. Additionally or alternatively, in an optional second step 1620, the wireless device provides user data. In an optional substep 1621 of the second step 1620, the wireless device provides the user data by executing a client application. In a further optional substep 1611 of the first step 1610, the wireless device executes a client application which provides the user data in reaction to the received input data provided by the host computer. In providing the user data, the executed client application may further consider user input received from the user. Regardless of the specific manner in which the user data was provided, the wireless device initiates, in an optional third substep 1630, transmission of the user data to the host computer. In a fourth step 1640 of the method, the host computer receives the user data transmitted from the wireless device, in accordance with the teachings of the embodiments described throughout this disclosure.

Figure 17:
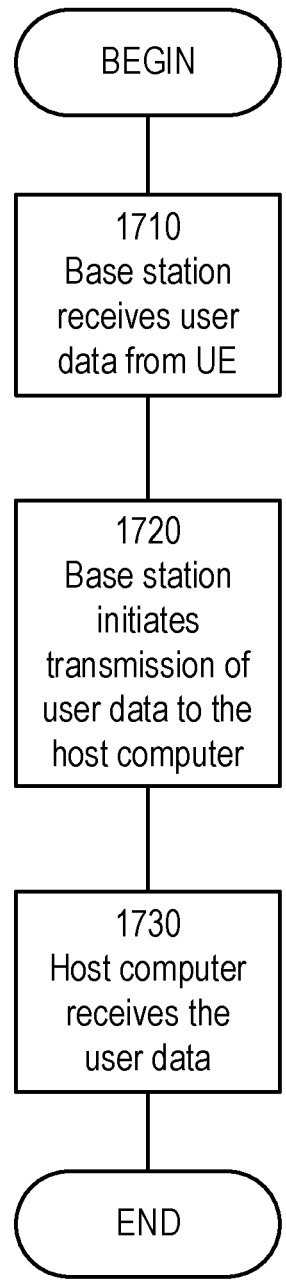

FIG. 17 is a flowchart illustrating a method implemented in a communication system, in accordance with one embodiment. The communication system includes a host computer, an access point and a wireless device which may be those described with reference to FIGS. 12 and 13. For simplicity of the present disclosure, only drawing references to FIG. 17 will be included in this section. In an optional first step 1710 of the method, in accordance with the teachings of the embodiments described throughout this disclosure, the access point receives user data from the wireless device. In an optional second step 1720, the access point initiates transmission of the received user data to the host computer. In a third step 1730, the host computer receives the user data carried in the transmission initiated by the access point.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the following statements shall not be construed so as to limit their scope.

For the avoidance of doubt, the following statements set out embodiments of the disclosure.

1. A method performed by a wireless transmitting device for a communication network, the communication network implementing a standard in which transmitting devices contend for access to a wireless transmission medium, a transmitting device being permitted to transmit using the wireless transmission medium for a window of time upon winning contention, the method comprising:
    initiating a first, initial transmission to one or more wireless receiving devices in the window of time, the first transmission comprising a first preamble; and
    subsequent to the first transmission, initiating a second transmission to one or more wireless receiving devices in the window of time, the second transmission comprising a second preamble which is shorter than the first preamble, or comprising no preamble.
2. The method according to embodiment 1, wherein the first preamble is shorter than the second preamble in that the second preamble is transmitted over a shorter period of time than the first preamble.
3. The method according to embodiment 1 or 2, wherein the first preamble comprises one or more training fields.
4. The method according to embodiment 3, wherein the first preamble comprises a non-legacy training field compatible with a particular version of the standard, and a legacy training field for backwards compatibility with one or more versions of the standard earlier than the particular version.
5. The method according to embodiment 4, wherein a length of the non-legacy training field is dependent on a number of spatial layers transmitted between the wireless transmitting device and the one or more wireless receiving devices.
6. The method according to any one of the preceding embodiments, wherein the first preamble comprises one or more signalling fields indicating one or more of: a modulation and coding scheme of the first transmission; and a duration of the first transmission.
7. The method according to embodiment 6, wherein the first preamble comprises one or more non-legacy signalling fields compatible with a particular version of the standard, and one or more legacy signalling fields for backwards compatibility with one or more versions of the standard earlier than the particular version.
8. The method according to any one of the preceding embodiments, wherein the second preamble does not comprise any legacy fields.
9. The method according to any one of the preceding embodiments, wherein the second preamble does not comprise any legacy training fields.
10. The method according to any one of the preceding embodiments, wherein the second preamble does not comprise any legacy signalling fields.
11. The method according to any one of the preceding embodiments, wherein the second transmission comprises a re-transmission of at least part of data contained within the first transmission.
12. The method according to any one of the preceding embodiments, wherein the second transmission comprises a payload but no preamble, and wherein the payload comprises an indication of a modulation and coding scheme utilized by the second transmission.
13. The method according to any one of the preceding embodiments, wherein the window of time corresponds to a transmission opportunity.
14. The method according to any one of the preceding embodiments, wherein the standard comprises an IEEE 802.11 standard.
15. A method performed by a wireless receiving device for a communication network, the communication network implementing a standard in which transmitting devices contend for access to a wireless transmission medium, a transmitting device being permitted to transmit using the wireless transmission medium for a window of time upon winning contention, the method comprising:
    receiving a first, initial transmission from a wireless transmitting device in the window of time, the first transmission comprising a first preamble; and
    subsequent to the first transmission, receiving a second transmission from the wireless transmitting device in the window of time, the second transmission comprising a second preamble which is shorter than the first preamble, or comprising no preamble.
16. The method according to embodiment 15, wherein the first preamble is shorter than the second preamble in that the second preamble is transmitted over a shorter period of time than the first preamble.
17. The method according to embodiment 15 or 16, wherein the first preamble comprises one or more training fields.
18. The method according to embodiment 17, wherein the first preamble comprises a non-legacy training field compatible with a particular version of the standard, and a legacy training field for backwards compatibility with one or more versions of the standard earlier than the particular version.
19. The method according to embodiment 18, wherein a length of the non-legacy training field is dependent on a number of spatial layers transmitted between the wireless transmitting device and the one or more wireless receiving devices.
20. The method according to any one of embodiments 15 to 19, wherein the first preamble comprises one or more signalling fields indicating one or more of: a modulation and coding scheme of the first transmission; and a duration of the first transmission.
21. The method according to embodiment 20, wherein the first preamble comprises one or more non-legacy signalling fields compatible with a particular version of the standard, and one or more legacy signalling fields for backwards compatibility with one or more versions of the standard earlier than the particular version.
22. The method according to any one of embodiments 15 to 21, wherein the second preamble does not comprise any legacy fields.
23. The method according to any one of embodiments 15 to 22, wherein the second preamble does not comprise any legacy training fields.

24. The method according to any one of embodiments 15 to 23, wherein the second preamble does not comprise any legacy signalling fields.
25. The method according to any one of embodiments 15 to 24, wherein the second transmission comprises a re-transmission of at least part of data contained within the first transmission.
26. The method according to any one of embodiments 15 to 25, wherein the second transmission comprises a payload but no preamble, and wherein the payload comprises an indication of a modulation and coding scheme utilized by the second transmission.
27. The method according to any one of embodiments 15 to 26, wherein the window of time corresponds to a transmission opportunity.
28. The method according to any one of embodiments 15 to 27, wherein the standard comprises an IEEE 802.11 standard.
29. The method according to any one of embodiments 15 to 28, further comprising decoding the second transmission using information obtained from the first preamble.
30. A wireless transmitting device comprising:
processing circuitry configured to perform the method as set out in any one of embodiments 1 to 14; and
power supply circuitry configured to supply power to the wireless transmitting device.
31. A wireless receiving device comprising:
processing circuitry configured to perform the method as set out in any one of embodiments 15 to 29; and
power supply circuitry configured to supply power to the wireless receiving device.
32. A non-transitory machine-readable medium storing instructions which, when executed by processing circuitry of a wireless transmitting device, cause the wireless transmitting device to perform the method as set out in any one of embodiments 1 to 14.
33. A non-transitory machine-readable medium storing instructions which, when executed by processing circuitry of a wireless receiving device, cause the wireless receiving device to perform the method as set out in any one of embodiments 15 to 29.

The invention claimed is:
1. A method performed by a wireless transmitting device for a communication network, the communication network implementing a standard in which transmitting devices contend for access to a wireless transmission medium, a transmitting device being permitted to transmit using the wireless transmission medium for a window of time upon winning contention, the method comprising:
initiating a first, initial transmission to one or more wireless receiving devices in the window of time, the first transmission comprising a first preamble and user data, wherein the first preamble comprises one or more signalling fields indicating one or more of: a modulation and coding scheme of the first transmission; and a duration of the first transmission;
receiving at least one acknowledgement message from the one or more wireless receiving devices, wherein the at least one acknowledgement message identifies user data that was not correctly received; and
subsequent to the first transmission, initiating a second transmission to the one or more wireless receiving devices in the window of time, the second transmission comprising a second preamble which is shorter than the first preamble, or comprising no preamble, and wherein the second transmission further comprises a re-transmission of user data that was not correctly received.
2. The method according to claim 1, wherein the second transmission comprises the second preamble, and wherein the second preamble is shorter than the first preamble in that the second preamble is transmitted over a shorter period of time than the first preamble.
3. The method according to claim 1, wherein the first preamble comprises one or more training fields.
4. The method according to claim 3, wherein the first preamble comprises a non-legacy training field compatible with a particular version of the standard, and a legacy training field for backwards compatibility with one or more versions of the standard earlier than the particular version.
5. The method according to claim 4, wherein a length of the non-legacy training field is dependent on a number of spatial layers transmitted between the wireless transmitting device and the one or more wireless receiving devices.
6. The method according to claim 1, wherein the first preamble comprises one or more non-legacy signalling fields compatible with a particular version of the standard, and one or more legacy signalling fields for backwards compatibility with one or more versions of the standard earlier than the particular version.
7. The method according to claim 1, wherein the second transmission comprises the second preamble, and wherein one or more of the following apply: the second preamble does not comprise any legacy fields, or the second preamble does not comprise any legacy training fields, or the second preamble does not comprise any legacy signalling fields.
8. The method according to claim 1, wherein the second transmission comprises a payload but no preamble, and wherein the payload comprises an indication of a modulation and coding scheme utilized by the second transmission.
9. The method according to claim 1, wherein the window of time corresponds to a transmission opportunity.
10. A method performed by a wireless receiving device for a communication network, the communication network implementing a standard in which transmitting devices contend for access to a wireless transmission medium, a transmitting device being permitted to transmit using the wireless transmission medium for a window of time upon winning contention, the method comprising:
receiving a first, initial transmission from a wireless transmitting device in the window of time, the first transmission comprising a first preamble and user data, wherein the first preamble comprises one or more signalling fields indicating one or more of: a modulation and coding scheme of the first transmission; and a duration of the first transmission; and
transmitting at least one acknowledgement message to the wireless transmitting device, wherein the at least one acknowledgement message identifies user data that was not correctly received; and
subsequent to the first transmission, receiving a second transmission from the wireless transmitting device in the window of time, the second transmission comprising a second preamble which is shorter than the first preamble, or comprising no preamble, and wherein the second transmission further comprises a re-transmission of user data that was not correctly received.
11. The method according to claim 10, further comprising decoding the second transmission using information obtained from the first preamble.
12. A wireless transmitting device for a communication network, the communication network implementing a standard in which transmitting devices contend for access to a wireless transmission medium, a transmitting device being permitted to transmit using the wireless transmission medium for a window of time upon winning contention, the wireless transmitting device comprising:

power supply circuitry configured to supply power to the wireless transmitting device; and processing circuitry configured to:

initiate a first, initial transmission to one or more wireless receiving devices in the window of time, the first transmission comprising a first preamble and user data, wherein the first preamble comprises one or more signalling fields indicating one or more of: a modulation and coding scheme of the first transmission; and a duration of the first transmission;

receive at least one acknowledgement message from the one or more wireless receiving devices, wherein the at least one acknowledgement message identifies user data that was not correctly received; and subsequent to the first transmission, initiate a second transmission to the one or more wireless receiving devices in the window of time, the second transmission comprising a second preamble which is shorter than the first preamble, or comprising no preamble, and wherein the second transmission further comprises a re-transmission of user data that was not correctly received.

13. The wireless transmitting device according to claim 12, wherein the second transmission comprises the second preamble, and wherein the second preamble is shorter than the first preamble in that the second preamble is transmitted over a shorter period of time than the first preamble.

14. The wireless transmitting device according to claim 12, wherein the first preamble comprises one or more training fields.

15. The wireless transmitting device according to claim 14, wherein the first preamble comprises a non-legacy training field compatible with a particular version of the standard, and a legacy training field for backwards compatibility with one or more versions of the standard earlier than the particular version.

16. The wireless transmitting device according to claim 15, wherein a length of the non-legacy training field is dependent on a number of spatial layers transmitted between the wireless transmitting device and the one or more wireless receiving devices.

17. The wireless transmitting device according to claim 12, wherein the first preamble comprises one or more non-legacy signalling fields compatible with a particular version of the standard, and one or more legacy signalling fields for backwards compatibility with one or more versions of the standard earlier than the particular version.

18. The wireless transmitting device according to claim 12, wherein the second transmission comprises the second preamble, and wherein one or more of the following apply: the second preamble does not comprise any legacy fields, or the second preamble does not comprise any legacy training fields, or the second preamble does not comprise any legacy signalling fields.

19. The wireless transmitting device according to claim 12, wherein the second transmission comprises a payload but no preamble, and wherein the payload comprises an indication of a modulation and coding scheme utilized by the second transmission.

20. The wireless transmitting device according to claim 12, wherein the window of time corresponds to a transmission opportunity.

21. A wireless receiving device for a communication network, the communication network implementing a standard in which transmitting devices contend for access to a wireless transmission medium, a transmitting device being permitted to transmit using the wireless transmission medium for a window of time upon winning contention, the wireless receiving device comprising:

power supply circuitry configured to supply power to the wireless receiving device; and processing circuitry configured to:

receive a first, initial transmission from a wireless transmitting device in the window of time, the first transmission comprising a first preamble and user data, wherein the first preamble comprises one or more signalling fields indicating one or more of: a modulation and coding scheme of the first transmission; and a duration of the first transmission;

transmit at least one acknowledgement message to the wireless transmitting device, wherein the at least one acknowledgement message identifies user data that was not correctly received; and subsequent to the first transmission, receive a second transmission from the wireless transmitting device in the window of time, the second transmission comprising a second preamble which is shorter than the first preamble, or comprising no preamble, and wherein the second transmission further comprises a re-transmission of user data that was not correctly received.

22. The wireless receiving device according to claim 21, wherein the second transmission comprises the second preamble, and wherein the second preamble is shorter than the first preamble in that the second preamble is transmitted over a shorter period of time than the first preamble.

23. A non-transitory machine-readable medium storing instructions for execution by processing circuitry of a wireless transmitting device for a communication network, the communication network implementing a standard in which transmitting devices contend for access to a wireless transmission medium, a transmitting device being permitted to transmit using the wireless transmission medium for a window of time upon winning contention, wherein the instructions, when executed by the processing circuitry, cause the wireless transmitting device to:

initiate a first, initial transmission to one or more wireless receiving devices in the window of time, the first transmission comprising a first preamble and user data, wherein the first preamble comprises one or more signalling fields indicating one or more of: a modulation and coding scheme of the first transmission; and a duration of the first transmission;

receive at least one acknowledgement message from the one or more wireless receiving devices, wherein the at least one acknowledgement message identifies user data that was not correctly received; and subsequent to the first transmission, initiate a second transmission to the one or more wireless receiving devices in the window of time, the second transmission comprising a second preamble which is shorter than the first preamble, or comprising no preamble, and wherein the second transmission further comprises a re-transmission of user data that was not correctly received.

24. A non-transitory machine-readable medium storing instructions for execution by processing circuitry of a wireless receiving device for a communication network, the communication network implementing a standard in which transmitting devices contend for access to a wireless transmission medium, a transmitting device being permitted to transmit using the wireless transmission medium for a window of time upon winning contention, wherein the instructions, when executed by the processing circuitry, cause the wireless receiving device to:
- receive a first, initial transmission from a wireless transmitting device in the window of time, the first transmission comprising a first preamble and user data, wherein the first preamble comprises one or more signalling fields indicating one or more of: a modulation and coding scheme of the first transmission; and a duration of the first transmission;
- transmit at least one acknowledgement message to the wireless transmitting device, wherein the at least one acknowledgement message identifies user data that was not correctly received; and
- subsequent to the first transmission, receive a second transmission from the wireless transmitting device in the window of time, the second transmission comprising a second preamble which is shorter than the first preamble, or comprising no preamble, and wherein the second transmission further comprises a re-transmission of user data that was not correctly received.

* * * * *

UNITED STATES PATENT AND TRADEMARK OFFICE
CERTIFICATE OF CORRECTION

PATENT NO. : 12,137,484 B2
APPLICATION NO. : 17/626022
DATED : November 5, 2024
INVENTOR(S) : Max et al.

It is certified that error appears in the above-identified patent and that said Letters Patent is hereby corrected as shown below:

In the Specification

In Column 1, Line 44, delete "sufficient" and insert -- sufficiently --, therefor.

In Column 6, Line 1, delete "(PLOP)" and insert -- (PLCP) --, therefor.

In Column 6, Line 12, delete "perform" and insert -- to perform --, therefor.

In Column 7, Line 39, delete "is transmitted" and insert -- transmitted --, therefor.

In Column 7, Line 48, delete "place" and insert -- place in --, therefor.

In Column 10, Line 4, delete "of more" and insert -- or more --, therefor.

In Column 10, Line 63, delete "known" and insert -- known as --, therefor.

In Column 11, Line 55, delete "L-SIG." and insert -- L-SIG). --, therefor.

In Column 12, Line 46, delete "whereas as" and insert -- whereas --, therefor.

In Column 14, Line 16, delete "of more" and insert -- or more --, therefor.

In Column 15, Line 7, delete "known" and insert -- known as --, therefor.

In Column 15, Line 32, delete "L-SIG." and insert -- L-SIG). --, therefor.

In Column 21, Line 8, delete "use" and insert -- user --, therefor.

Signed and Sealed this
Twenty-second Day of April, 2025

Coke Morgan Stewart
*Acting Director of the United States Patent and Trademark Office*

In the Claims

In Column 26, Line 50, in Claim 10, delete "transmission; and" and insert -- transmission; --, therefor.